(12) United States Patent
Nagarajan et al.

(10) Patent No.: US 12,340,227 B2
(45) Date of Patent: *Jun. 24, 2025

(54) SPARSE SIMD CROSS-LANE PROCESSING UNIT

(71) Applicant: Google LLC, Mountain View, CA (US)

(72) Inventors: Rahul Nagarajan, San Jose, CA (US); Suvinay Subramanian, Sunnyvale, CA (US); Arpith Chacko Jacob, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,005

(22) Filed: Mar. 6, 2024

(65) Prior Publication Data

US 2024/0211269 A1 Jun. 27, 2024

Related U.S. Application Data

(63) Continuation of application No. 17/972,663, filed on Oct. 25, 2022, now Pat. No. 11,966,745.

(Continued)

(51) Int. Cl.
*G06F 9/38* (2018.01)
*G06F 9/30* (2018.01)

(52) U.S. Cl.
CPC ........ *G06F 9/3887* (2013.01); *G06F 9/30036* (2013.01)

(58) Field of Classification Search
None
See application file for complete search history.

(56) References Cited

U.S. PATENT DOCUMENTS 6,704,860 B1 3/2004 Moore
7,206,922 B1 4/2007 Steiss
(Continued)

FOREIGN PATENT DOCUMENTS

JP 2018521427 A 8/2018
JP 2021177366 A 11/2021
(Continued)

OTHER PUBLICATIONS

Chhugan et al., "Efficient Implementation of Sorting on Multi-Core SIMD CPU Architecture", PVLDB '08, Aug. 23-28, 2008, Auckland, New Zealand, 12 pages.

(Continued)

*Primary Examiner* — Scott C Sun
(74) *Attorney, Agent, or Firm* — Lerner David LLP

(57) ABSTRACT

Aspects of the disclosure are directed to a cross-lane processing unit (XPU) for performing data-dependent operations across multiple data processing lanes of a processor. Rather than implementing operation-specific circuits for each data-dependent operation, the XPU can be configured to perform different operations in response to input signals configuring individual operations performed by processing cells and crossbars arranged as a stacked network in the XPU. Each processing cell can receive and process data across multiple data processing lanes. Aspects of the disclosure include configuring the XPU to use a vector sort network to perform a duplicate count eliminating the need to configure the XPU separately for sorting and duplicate counting.

20 Claims, 18 Drawing Sheets

Related U.S. Application Data

(60) Provisional application No. 63/279,262, filed on Nov. 15, 2021.

(56) References Cited

U.S. PATENT DOCUMENTS

| | | |
|---|---|---|
| 7,248,266 B2 | 7/2007 | Tuomi |
| 7,249,202 B2 | 7/2007 | Simon et al. |
| 7,461,210 B1 | 12/2008 | Wentzlaff et al. |
| 7,613,886 B2 | 11/2009 | Yamazaki |
| 7,636,835 B1 | 12/2009 | Ramey et al. |
| 7,917,701 B2 | 3/2011 | Charra et al. |
| 9,086,872 B2 | 7/2015 | Hargil et al. |
| 9,323,672 B2 | 4/2016 | Kim et al. |
| 9,628,146 B2 | 4/2017 | Van Nieuwenhuyze et al. |
| 9,851,917 B2 | 12/2017 | Park et al. |
| 11,113,233 B1 | 9/2021 | Volpe |
| 11,182,110 B1 | 11/2021 | Ansari et al. |
| 11,210,760 B2 | 12/2021 | Nurvitadhi et al. |
| 11,340,792 B2 | 5/2022 | Danilov et al. |
| 2004/0133765 A1 | 7/2004 | Tanaka et al. |
| 2007/0198901 A1 | 8/2007 | Ramchandran et al. |
| 2012/0159130 A1 | 6/2012 | Smelyanskiy et al. |
| 2012/0303932 A1 | 11/2012 | Farabet et al. |
| 2013/0151482 A1 | 6/2013 | Tofano |
| 2017/0004089 A1 | 1/2017 | Clemons et al. |
| 2017/0351516 A1 | 12/2017 | Mekkat et al. |
| 2018/0067899 A1 | 3/2018 | Rub |
| 2018/0081690 A1 | 3/2018 | Krishna et al. |
| 2018/0109449 A1 | 4/2018 | Sebexen et al. |
| 2018/0217836 A1 | 8/2018 | Johnson |
| 2018/0285233 A1 | 10/2018 | Norrie et al. |
| 2018/0322387 A1 | 11/2018 | Sridharan et al. |
| 2019/0004814 A1 | 1/2019 | Chen et al. |
| 2019/0050717 A1 | 2/2019 | Temam et al. |
| 2019/0121784 A1 | 4/2019 | Wilkinson et al. |
| 2019/0303311 A1 | 10/2019 | Bilski et al. |
| 2019/0340722 A1 | 11/2019 | Aas et al. |
| 2020/0120154 A1* | 4/2020 | Ren ................... H04L 67/568 |
| 2020/0183738 A1 | 6/2020 | Champigny |
| 2020/0192742 A1 | 6/2020 | Boettcher et al. |
| 2020/0293488 A1 | 9/2020 | Ray et al. |
| 2020/0310797 A1 | 10/2020 | Corbal et al. |
| 2021/0081691 A1 | 3/2021 | Chen et al. |
| 2021/0109761 A1 | 4/2021 | Wang et al. |
| 2021/0194793 A1 | 6/2021 | Huse |
| 2021/0303481 A1 | 9/2021 | Ray et al. |
| 2021/0326067 A1 | 10/2021 | Li |
| 2022/0012060 A1 | 1/2022 | Fok et al. |
| 2023/0229524 A1 | 7/2023 | Dearth et al. |

FOREIGN PATENT DOCUMENTS

| | | | |
|---|---|---|---|
| JP | 2021532430 A | | 11/2021 |
| WO | 9707451 A2 | | 2/1997 |
| WO | 2006106342 A2 | | 10/2006 |

OTHER PUBLICATIONS

Yavits et al., "Sparse Matrix Multiplication on an Associative Processor", retrieved from the Internet on Nov. 19, 2021 <https://arxiv.org/ftp/arxiv/papers/1705/1705.07282.pdf>, 10 pages.

Batcher odd-even mergesort, From Wikipedia, the free encyclopedia, retrieved from the Internet on Nov. 19, 2021 <https://en.wikipedia.org/wiki/Batcher_odd%E2%80%93even_mergesort>, 2 pages.

Chole et al. SparseCore: An Accelerator for Structurally Sparse CNNs. 2018. 3 pages. Retrieved from the Internet: <https://mlsys.org/Conferences/doc/2018/72.pdf>.

Fang et al. Active Memory Operations. Proceedings of the International Conference on Supercomputing—Proceedings of ICS07: 21st ACM International Conference on Supercomputing 2007 Association for Computing Machinery US, ACM, 2 Penn Plaza, Suite 701 New York, NY 10121-0701 USA, Jun. 17, 2007 (Jun. 17, 2007), pp. 232-241, DOI: 10.1145/1274971.1275004.

International Search Report and Written Opinion for International Application No. PCT/US2022/033710 dated Dec. 19, 2022. 17 pages.

Prabhakar et al. Plasticine: A Reconfigurable Architecture For Parallel Patterns. Proceedings of the 44th Annual International Symposium on Computer Architecture , ISCA ' 17, ACM Press, New York, New York, USA, Jun. 24, 2017 (Jun. 24, 2017), pp. 389-402.

International Search Report and Written Opinion for International Application No. PCT/US2022/049353 dated Feb. 6, 2023. 17 pages.

International Search Report and Written Opinion for International Application No. PCT/US2022/048357 dated Feb. 22, 2023. 16 pages.

International Search Report and Written Opinion for International Application No. PCT/US2022/048919 dated Feb. 22, 2023. 16 pages.

Deb, D., et al., COPE: Reducing Cache Pollution and Network Contention by Inter-tile Coordinated Prefetching in NoC-based MPSoCs, 2020, ACM. pp. 17:1-17:31. (Year: 2020).

Deb, D. et al., ECAP: energy-efficient caching for prefetch blocks in tiled chip multiprocessor, 2019, The Institution of Engineering and Technology, pp. 417-428. (Year: 2019).

Paul, S. et al., Dynamic task allocation and scheduling with contention-awareness for Network-on-Chip based multicore systems, Jan. 2021, ELSEVIER, 16 pages. (Year: 2021).

Yang, L. et al., Optimal Application Mapping and Scheduling for Network-on-Chips with Computation in STT-RAM Based Router. 2019, IEEE, pp. 1174-1189. (Year: 2019).

Office Action for Japanese Patent Application No. 2023-570416 dated Jan. 7, 2025. 6 pages.

Gaye et al. An Analysis of the Hot Spot Contention and Message Combining on the SSS-MIN. May 25, 1994. D-I vol. J77-D-I, No. 5, pp. 354-363.

Notice of Grant for Japanese Patent Application No. 2023-571623 dated Feb. 4, 2025. 3 pages.

Notice of Grant for Japanese Patent Application No. 2023-572877 dated Feb. 4, 2025. 3 pages.

* cited by examiner

US 12,340,227 B2

SPARSE SIMD CROSS-LANE PROCESSING UNIT

CROSS-REFERENCE TO RELATED APPLICATIONS

The present application is a continuation of U.S. patent application Ser. No. 17/972,663, filed Oct. 25, 2022, which claims the benefit of the filing date of U.S. Provisional Patent Application No. 63/279,262, filed Nov. 15, 2021, the disclosures of which are hereby incorporated herein by reference.

BACKGROUND

A single instruction, multiple data (SIMD) processing unit is a type of processing unit for parallel processing of multiple data inputs by performing the same operation on each of the inputs. Operations to be accelerated by SIMD processing units are predetermined at design time of the SIMD processing unit.

Neural networks are machine learning models that include one or more layers of nonlinear operations to predict an output for a received input. In addition to an input layer and an output layer, some neural networks include one or more hidden layers. The output of each hidden layer can be input to another hidden layer or the output layer of the neural network.

Each layer of the neural network can generate a respective output from a received input according to values for one or more model parameters for the layer. The model parameters can be weights or biases that are determined through a training algorithm to cause the neural network to generate accurate output.

A feature is a measurable property of an input example received by a machine learning model. A feature value is a value for a respective feature and can be an integer value.

BRIEF SUMMARY

Aspects of the disclosure are directed to a cross-lane processing unit (XPU) for performing single instruction, multiple data (SIMD) data-dependent operations across multiple data processing lanes of a processor. Rather than physically fabricating operation-specific circuits for each data-dependent operation, the XPU can be configured to perform different operations in response to input signals by configuring processing cells to perform individual operations and arranging crossbars as a stacked network in the XPU. Aspects of the disclosure provide for identifying unique values in an input vector while also performing a duplicate count of unique and non-unique values in the vector, by reusing the same stacked network configuration in the XPU. Each processing cell can receive and process data across multiple data processing lanes. The XPU as described herein eliminates the need for hardware to be configured separately for sorting, for example for identifying unique values in an input vector, and counting duplicate values in an input vector. The XPU can be implemented as part of a hardware circuit, complementing computation of dense data structures, such as dense matrices, with accelerated processing of sparse data structures, such as sparse vectors or matrices.

An aspect of the disclosure provides for a hardware circuit. The hardware circuit includes a plurality of stages, where each stage includes a crossbar and two or more cells. The hardware circuit further includes a plurality of data processing lanes streaming respective data from an upstream input to a downstream destination through a plurality of cells and plurality of crossbars of the plurality of stages. The hardware circuit is configured to receive input data from the upstream input along the plurality of data processing lanes and receive a first instruction for performing a first operation. In response to receiving the first instruction, for each stage, the hardware circuit is further configured to send a respective second instruction to respective processing cells of the stage, where each is cell configured to perform a respective second operation in response to receiving an input from a respective data processing lane and send a respective third instruction to a respective crossbar for the stage, where the crossbar is configured to permute output from each cell of the stage to cells of a next stage along the plurality of data processing lanes. The hardware circuit is also configured to perform the first operation by processing the received input data along the plurality of data processing lanes and the plurality of cells configured to perform respective second operations.

In an example, each cell is configured to receive a respective first input operand from a respective data processing lane passing through the cell and a respective second input operand from a respective crossbar of a stage upstream to the cell. In another example, the downstream destination of data of the plurality of data processing lanes is a vector processing unit, where the vector processing unit is configured to perform single instruction, multiple data vector operations on output data of the hardware circuit.

In yet another example, each of the cells are configured to perform one or more of a plurality of predetermined primitive operations in response to one or more received instructions; the hardware circuit further includes a plurality of control cells; and in sending the respective second instruction to the respective processing cells, the hardware circuit is configured to generate and send, by each control cell, a respective control signal to each processing cell based on the first operation specified by the first instruction. In yet another example, in generating and sending, by each control cell, the respective control signal, the hardware circuit is configured to generate a respective control signal for causing each processing cell to perform one of a respective arithmetic, comparison, and bypass operation, based on at least one of the stage the processing cell is in or the data processing lane passing through the processing cell. In yet another example, the plurality of cells and plurality of crossbars form a processing network of connected cells across the plurality of stages and plurality of data processing lanes, where the processing network of connected cells are configured to receive the input data and to generate respective output data in accordance with performing the first operation on the input data. In yet another example, the processing network of connected cells is configured to perform a combined vector sort and duplicate count operation, where the combined operation includes: receiving, by the processing network, an input vector of elements; and generating, by the processing network and as output, a sorted output vector and data specifying counts of duplicate elements in the input vector.

In yet another example, the input data includes sparse vector data, and where, after sending the respective second and third instructions, the hardware circuit is configured to perform one of a vector scan, vector summation, vector sort, or a vector duplicate count.

Another aspect of the disclosure provides for a system including a hardware circuit including a plurality of stages, where each stage includes a crossbar and two or more cells and a plurality of data processing lanes streaming respective data from an upstream input to a downstream destination through a plurality of cells and plurality of crossbars of the plurality of stages. The hardware circuit is configured to receive input data from the upstream input along the plurality of data processing lanes and receive a first instruction for performing a first operation. The hardware circuit is further configured to, in response to receiving the first instruction, for each stage: send a respective second instruction to respective processing cells of the stage, where each cell is configured to perform a respective second operation in response to receiving an input from a respective data processing lane; and send a respective third instruction to a respective crossbar for the stage, where the crossbar is configured to permute output from each cell of the stage to cells of a next stage along the plurality of data processing lanes. The hardware circuit is also configured to perform the first operation by processing the received input data along the plurality of data processing lanes and the plurality of cells configured to perform respective second operations.

In an example, each cell is configured to receive a respective first input operand from a respective data processing lane passing through the cell and a respective second input operand from a respective crossbar of a stage upstream to the cell. In another example, the downstream destination of data of the plurality of data processing lanes is a vector processing unit, where the vector processing unit is configured to perform single instruction, multiple data vector operations on output data of the hardware circuit.

In yet another example, each of the cells are configured to perform one or more of a plurality of predetermined primitive operations in response to one or more received instructions; the hardware circuit further includes a plurality of control cells; and in sending the respective second instruction to the respective processing cells, the hardware circuit is configured to generate and send, by each control cell, a respective control signal to each processing cell based on the first operation specified by the first instruction. In yet another example, in generating and sending, by each control cell, the respective control signal, the hardware circuit is configured to generate a respective control signal for causing each processing cell to perform one of a respective arithmetic, comparison, and bypass operation, based on at least one of the stage the processing cell is in or the data processing lane passing through the processing cell. In yet another example, the plurality of cells and plurality of crossbars form a processing network of connected cells across the plurality of stages and plurality of data processing lanes, where the processing network of connected cells are configured to receive the input data and to generate respective output data in accordance with performing the first operation on the input data. In yet another example, the processing network of connected cells is configured to perform a combined vector sort and duplicate count operation, where the combined operation includes: receiving, by the processing network, an input vector of elements; and generating, by the processing network and as output, a sorted output vector and data specifying counts of duplicate elements in the input vector.

In yet another example, the input data includes sparse vector data, and where, after sending the respective second and third instructions, the hardware circuit is configured to perform one of a vector scan, vector summation, vector sort, or a vector duplicate count.

Yet another aspect of the disclosure provides for a computer-implemented method. The method includes receiving, by a hardware circuit comprising a plurality of stages, each stage including a crossbar and two or more cells and a plurality of data processing lanes streaming respective data from an upstream input to a downstream destination, through a plurality of cells and plurality of crossbars of the plurality of stages, input data from the upstream input along the plurality of data processing lanes and a first instruction for performing a first operation. The method further includes, in response to receiving the first instruction, for each stage: sending, by the hardware circuit, a respective second instruction to respective processing cells of the stage, each cell configured to perform a respective second operation in response to receiving an input from a respective data processing lane; and sending, by the hardware circuit, a respective third instruction to a respective crossbar for the stage, where the crossbar is configured to permute output from each cell of the stage to cells of a next stage along the plurality of data processing lanes. The method also includes performing, by the hardware circuit, the first operation by processing the received input data along the plurality of data processing lanes and the plurality of cells configured to perform respective second operations.

In an example, each cell is configured to receive a respective first input operand from a respective data processing lane passing through the cell and a respective second input operand from a respective crossbar of a stage upstream to the cell. In another example, the downstream destination of data of the plurality of data processing lanes is a vector processing unit, the vector processing unit configured to perform single instruction, multiple data vector operations on output data of the hardware circuit.

In yet another example, each of the cells are configured to perform one or more of a plurality of predetermined primitive operations in response to one or more received instructions; the hardware circuit further includes a plurality of control cells; and sending the respective second instruction to the respective processing cells comprises generating and sending, by each control cell, a respective control signal to each processing cell based on the first operation specified by the first instruction.

DETAILED DESCRIPTION

Overview

Figure 1:
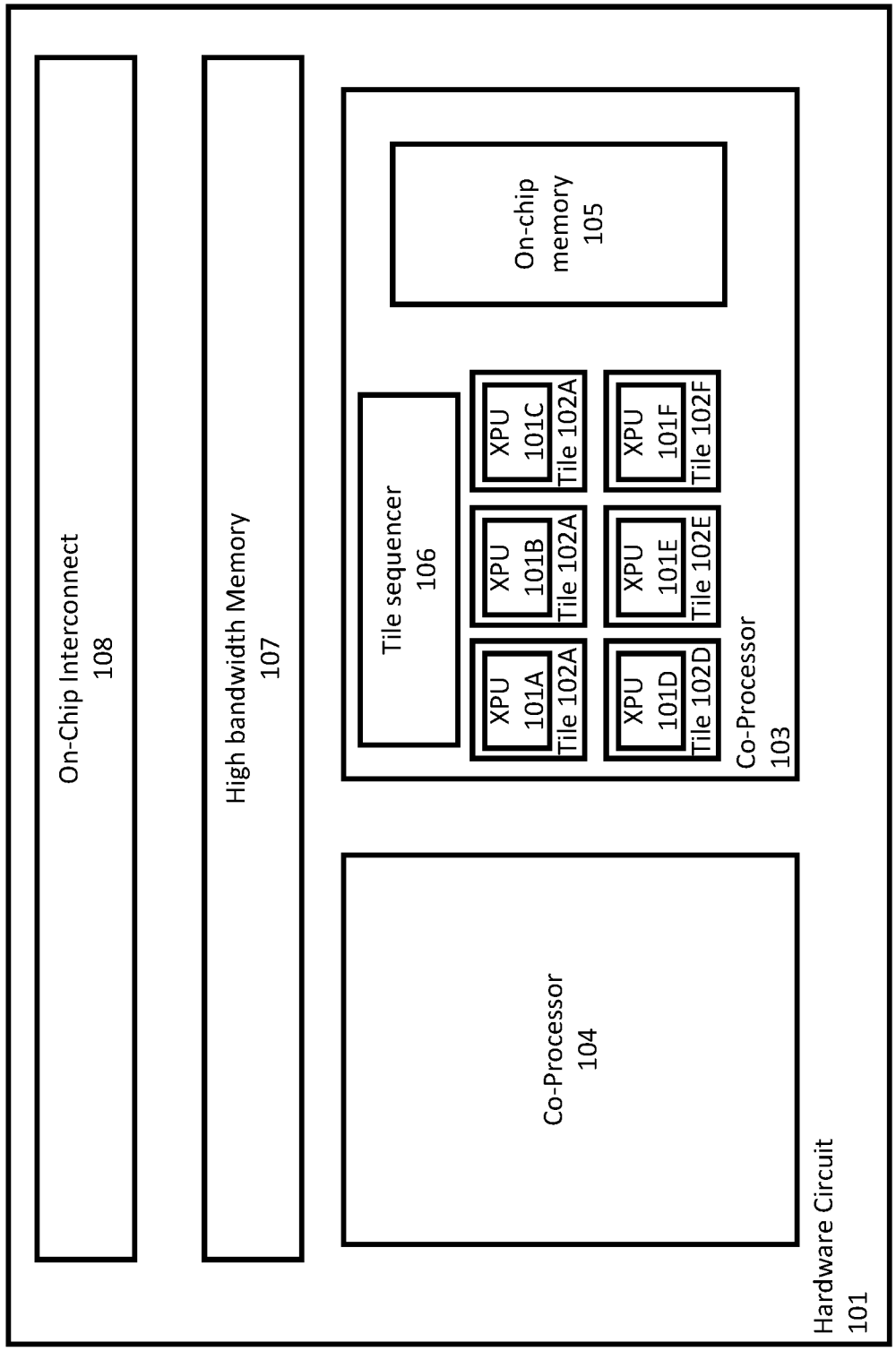
FIG. 1 depicts a block diagram of an example hardware circuit implementing cross-lane processing units (XPUs) according to aspects of the disclosure.

Aspects of the disclosure are directed to a cross-lane processing unit (XPU) for performing data-dependent operations across multiple data processing lanes of a processor. Rather than implementing physically fabricated operation-specific circuits for each data-dependent operation, the XPU can be configured to perform different operations in response to input signals by configuring individual operations performed by processing cells and arranging crossbars as a stacked network in the XPU. The XPU operates across values of multiple SIMD data processing lanes. The XPU can be implemented as part of a co-processor configured for SIMD parallel processing. The co-processor implementing the XPU can be configured to perform data-dependent operations.

A data-dependent operation, also referred to as an "input-dependent operation", is an operation in which the amount of computational work to perform the operation is not known in advance but depends on the nature of the data. Computational work can be measured, for example, in the number of operations or processing cycles required to perform the data-dependent operation. Example data-dependent operations include operations for vector sorting, identifying unique values in an input vector, counting duplicate values within a vector, and operations for manipulating the shape or size of vectors of varying lengths. Data-dependent operations are irregular, at least because of differences in random memory access patterns for performing the same type of operation on different inputs. As a result, data-dependent operations are difficult to optimize performance for, as opposed to other types of operations in which the computational work does not vary based on the nature of the input data, such as its shape or degree or sparsity.

Data-dependent operations include operations performed on sparse data. The sparsity of a data structure is a measure of the ratio of its non-empty to empty elements. Depending on the data structure, an empty element may be zero, a reserved word indicating the absence of a value for the element or have a value so small as to be deemed to insignificantly contribute to an operation performed with the data structure as input. A data structure is sparse if it has more empty than non-empty elements. Some data structures can be more or less sparse than others.

Aspects of the disclosure provide for an XPU to first process the sparse data before passing the data to the co-processor downstream in the processing pipeline enables wider workloads for efficient computation than previously possible without the XPU.

Because the XPU can handle a variety of data-dependent operations, processing pipelines and corresponding processors can be designed without the restriction of pre-defining input data for processing on existing SIMD architectures. Without the XPU, existing SIMD architectures are unable to efficiently accelerate data-dependent operations, such as embedding generation from a sparse collection of features to a machine learning model.

Example data-dependent operations include generating an embedding for an input training example. An embedding can be a vector, or some other data structure mapped from an input, which has a higher dimensionality than the embedding. Embedding generation can be performed as part of a workload processed according to a pipeline. As other examples, the XPU may perform vector scatter or gather operations, segment sums, and/or partition the sparse feature tensors. The XPU as described herein can be a complementary processing unit to other components of a processor or connected components, such as a vector processing unit built according to a SIMD parallel processing paradigm. One or more XPUs can be connected in respective processor cores of a larger processor, which itself may include other components for accelerating the performance of certain workloads, such as training neural networks.

Moreover, the XPU is not limited to performing a certain type of data-dependent operation, therefore a processor can be designed to include the XPU to complement other types of processing units for multiple different pipelines. Because the XPU can be configured on a per-workload basis, the physical footprint of the XPU is reduced versus other approaches in which specialized circuits are physically fabricated on a processor as complementary units for computation of sparse data. The functionality of the XPU can also be extended through the use of an instruction set or extension to an existing instruction set of the host processor, further improving the adaptability of different data-dependent operations as pipeline data receive changes. Instructions can be provided as signals to components of the XPU responsible for translating the instructions to configure the individual processing cells and crossbars of the XPU. The XPU can be configured using a program compiled by a corresponding compiler for the hardware circuit implementing the XPU.

The XPU includes a network of individual processing cells, each cell processing data that passes through one or more data processing lanes through crossbar connections between the processing cells. Each data processing lane can include one or more registers for temporarily storing data during processing. Each processing cell is configured to perform one or more primitive operations on multiple sets of operands. A first set of operands is provided as input from a data processing lane of the processor shared by the processing cell. A second set of operands is provided from a crossbar configured to coordinate data transmission across the multiple data processing lanes of the XPU.

The XPU can be divided into a number of pipeline stages, with each stage including a crossbar, one or more processing cells and a corresponding control cell for each processing cell. The number of stages can vary, for example based on the composed operation the XPU is configured to perform for a current workload.

The XPU performs a composed operation by performing multiple primitive operations across the pipeline stages of the stacked network of processing elements and crossbars. A composed operation is an operation performed on input by the XPU to generate an output.

Primitive operations are operations that individual processing cells of the XPU are configured to perform, which when executed by the XPU, causes the XPU to perform the composed operation. Performing a composed operation may require performing other composed operations. For example, to perform a vector sort, the XPU may perform pre-fix summation, another operation composed of multiple primitive operations. Example primitive operations include operations for comparison, arithmetic, or bypassing input data. The XPU performs a composed operation by configuring each of multiple individual processing cells and crossbars arranged according to one of multiple pipeline stages for the XPU.

The primitive operations performed at each stage of the XPU can be programmatically defined and may vary from workload-to-workload. The primitive operation a processing cell is configured to perform is determined by one or more control signals or instructions received by a respective control cell for the processing cell. The exact primitive operations performed by the processing cell can depend on, for example, the composed operation the XPU is currently configured to perform. In other examples, processing cells in different lanes or different stages of the XPU can be configured to always perform one or more predetermined primitive operations. After the XPU generates an output, the output can be passed along multiple data processing lanes to another processing unit or memory unit of a processor implementing the XPU.

Aspects of the disclosure provide for an XPU configured to receive an input vector, and determine both unique values in the vector, as well as the number of duplicates for each value, using the same stacked network configuration. The XPU can perform a vector sort, which is an in-place, stable sort of key-value tuples of an input vector, sorted by key. Vector duplicate count returns a running duplicate count of values of the key-value tuples of the input vector. The sorted list and duplicate count can be used to remove non-unique values from the input vector. The XPU is configured to perform both vector sort and duplicate count according to the same configuration of processing cells and crossbars, as described herein. By using the same configuration, the XPU can perform both composed operations more efficiently, at least because the XPU does not have to be re-configured in between performing a vector sort to identify unique values and generating a vector duplicate count for a given input vector. Other composed operations that the XPU is configured to perform include scan, segmented scan, parallel-prefix sum, vector partition, vector histogram, vector compact, vector permute, vector reduce, vector shift-insert, vector gather, vector scatter, etc.

Aspects of the disclosure can provide for the following technical advantages. A hardware circuit implementing the XPU can provide for more flexible and programmable hardware for embedding-class workloads and other data-dependent operations that are not efficiently parallelizable. The XPU provides an acceleration path for different classes of data-dependent operations on a workload-by-workload basis, without requiring that the XPU be fixed to perform only certain operations efficiently. By providing for a programmable unit as described herein, the implementing hardware circuit can robustly adapt to the demands of different workloads, complementing parallelizable data-independent SIMD operations, which otherwise may be inefficient or ineffective for workloads requiring data-dependent operations.

A hardware circuit, such as an application-specific integrated circuit, can be designed with different quantities of XPUs to further coordinate and distribute workloads at scale. The XPU as described herein also allows for efficient performance of multiple operations using the same configuration, further reducing processing time and configuration time. For instance, the XPU can be configured to perform both vector sorting and vector duplicate counting, instead of separate configurations of the XPU and/or separate instances of specialized circuits for accelerating those operations.

Example Systems

FIG. 1 is a block diagram of a hardware circuit 101 implementing cross-lane processing units (XPUs) 101A-F, according to aspects of the disclosure. The hardware circuit 101 can include a co-processor 103, a co-processor 104, high-bandwidth memory 107, and an on-chip interconnect 108. The co-processor 103 can include one or more tiles 102A-F, each tile implementing a respective XPU 101A-F. The co-processor 103 can include a tile sequencer 106 configured to coordinate input and output data across the tiles 102A-F.

The co-processor 103 is configured for performing data-dependent operations using the XPUs 102A-F. As described in more detail herein with reference to FIGS. 2-4, the XPUs 102A-F are connected to a series of data processing lanes, each lane streaming data through the XPUs 102A-F. The streamed data can be retrieved from the on-chip memory 105, which can be any of a variety of different memory devices, including main memory, cache, or persistent storage, such as solid state or hard disk storage. The streamed data can also be retrieved from the co-processor 104, the high bandwidth memory 107 servicing one or both of the co-processors 103 and 104, and/or another source of data connected to the hardware circuit 101 through the on-chip interconnect 108.

The co-processor 104 can be configured for acceleration of certain operations, such as matrix-matrix multiplication, matrix-vector multiplication, etc. In some examples, the co-processor 104 is on a different device than the rest of the hardware circuit 101 and communicates data to the hardware circuit through the on-chip interconnect 108. The on-chip interconnect 108 can be a data bus or any form of interconnect according to any of a variety of communication standards, for example PCIe.

An example input to the hardware circuit 101 is a tensor representing input data and/or model parameters of a machine learning model to be executed using the hardware circuit 101. A tensor is a data structure generalizing various other common data structure types of differing dimensions. A tensor can include zero or more elements, which can be of one or more different data types, such as integers, floating-point values, Boolean values, etc. Within each data type, a data type can be parameterized according to a certain level of precision, for example an 8-bit, 16-bit, or 32-bit integer or floating-point value. The dimension of a tensor is referred to as its "rank." A tensor of rank zero is a single element, also called a scalar. A tensor of rank one is also called a vector. A tensor of rank two is also called a matrix. Vectors and matrices can also be referred to as having different ranks. For example, a vector of rank two is equivalent to a matrix. A tensor of a non-zero rank can be described as a collection of tensors one rank lower. For example, a vector of rank one is a collection of scalar values, and a matrix of rank two is a collection of vectors of rank one.

The hardware circuit 101 may at least partially implement a processing pipeline for training a neural network. The pipeline may include generating embeddings for input training examples. An embedding can represent features of an input training example using less data, allowing for more efficient processing. Feature tensors for different input training examples will have different degrees of sparsity, which affect the amount of computational work required to generate a corresponding embedding. The hardware circuit 101 can be configured to receive a tensor of feature values representing a training input example and generate an embedding as a tensor having a lower rank than the feature tensor.

To generate the embeddings, the co-processor 103 is configured to implement a variety of data-dependent operations for efficient sparse data computation on the XPUs 102A-F. These operations include sorting or summing sparse vectors, operations for summarizing the contents of input vectors, and operations for translating sparse matrices from one sparse matrix storage format to another.

Instead of physical predetermined circuits for accelerating the performance of data-dependent operations, the XPUs 102A-F can be configured, for example programmed, to perform a variety of different data-dependent operations. The co-processor 103 allows for generalized support of processing sparse data, while still allowing a complementary co-processor 104 to perform highly efficient and parallelizable operations.

The hardware circuit 101 can be any of a variety of different types of processing units, for example a central processing unit (CPU), a graphics processing unit (GPU), a field-programmable gate array (FPGA), or an application-specific integrated circuit (ASIC), such as a tensor processing unit (TPU). The hardware circuit 101 can be implemented on a computing device, which itself may be part of a system of one or more devices, as described herein with reference to FIG. 11.

Figure 2:
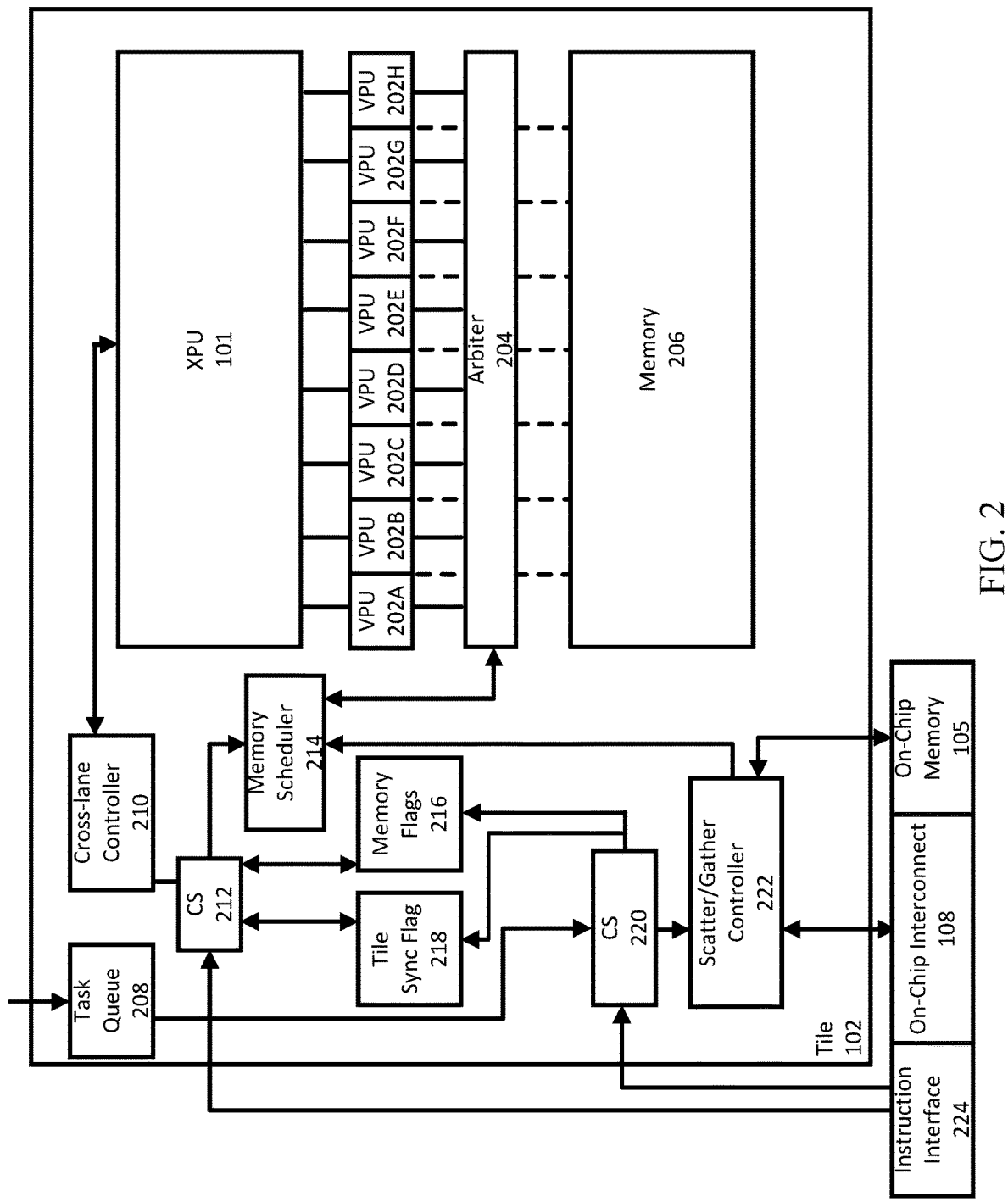
FIG. 2 depicts a block diagram of an example tile implementing an XPU according to aspects of the disclosure.

FIG. 2 is a block diagram of an example tile 102 implementing an XPU 101. The XPU 101 is coupled to a cross-lane controller 210. The cross-lane controller 210 provides a separate thread of control to allow cross-lane instructions on the XPU 101. As described herein, the XPU can receive a first instruction, for example through one or more control signals, which can be converted into one or more second and third instructions and provided to processing cells and crossbars of the XPU 101, respectively, for performing a composed operation specified by the first instruction. Instructions to the XPU 101 can be carried over control signals, in which processing cells and crossbars of the XPU 101 are configured to interpret to perform a corresponding primitive operation. An example instruction can be an opcode of an instruction set architecture (ISA).

The tile 102 can receive data from the on-chip interconnect 108, as well as from the on-chip memory 105 as described with reference to FIG. 1. The XPU can also receive instructions from an instruction interface 224, for example from the tile sequencer 106 through a scalar core 212 or scalar core 220. A scatter/gather controller 222 of the tile 102 can receive incoming data and control what data is passed in the memory 206 through a memory scheduler 214. The memory scheduler 214 coordinates how data is accessed and retrieved from the memory 206. The memory 206 is private to the tile 102, and not accessible by other components connected to the tile 102, such as other tiles. Arbiter 204 is configured to manage which of VPUs 202A-H access the memory 206, for example on a clock-cycle to clock-cycle basis. The tile 102 can maintain a task queue 208 of tasks to be performed by the tile 102. The tile 102 can also maintain registers of tile synchronization flags 218 and/or memory flags 216 for synchronizing the tile 102 with other tiles of the hardware circuit 101 and the memory 206, respectively.

Vector processing units (VPUs) 202A-H are connected to the XPU 101 through data processing lanes, indicated by solid lines between the XPU 101 and the VPUs 202A-H. The dashed lines between the XPU 101 and the VPUS 202A-H represent control signals, which can be received by control cells in the XPU 101 for configuring the XPU 101 to perform a composed operation corresponding to the received control signals. A vector processing unit is configured for efficient operation on input vectors. The length of vectors processed by the tile 102 at a time can depend on the number or width of VPUs implemented by the tile. For example, eight VPUs 202A-H are 8-wide. VPUs 202A-H can process data along the same data processing lane. The VPUs 202A-H can be configured to perform scalar operations on elements of incoming vectors from the memory 206. The VPUs 202A-H can receive data from the XPU 101, which, as described herein, can process data across the data processing lanes, instead of merely along the lanes as performed by each VPU 202A-H.

Figure 3:
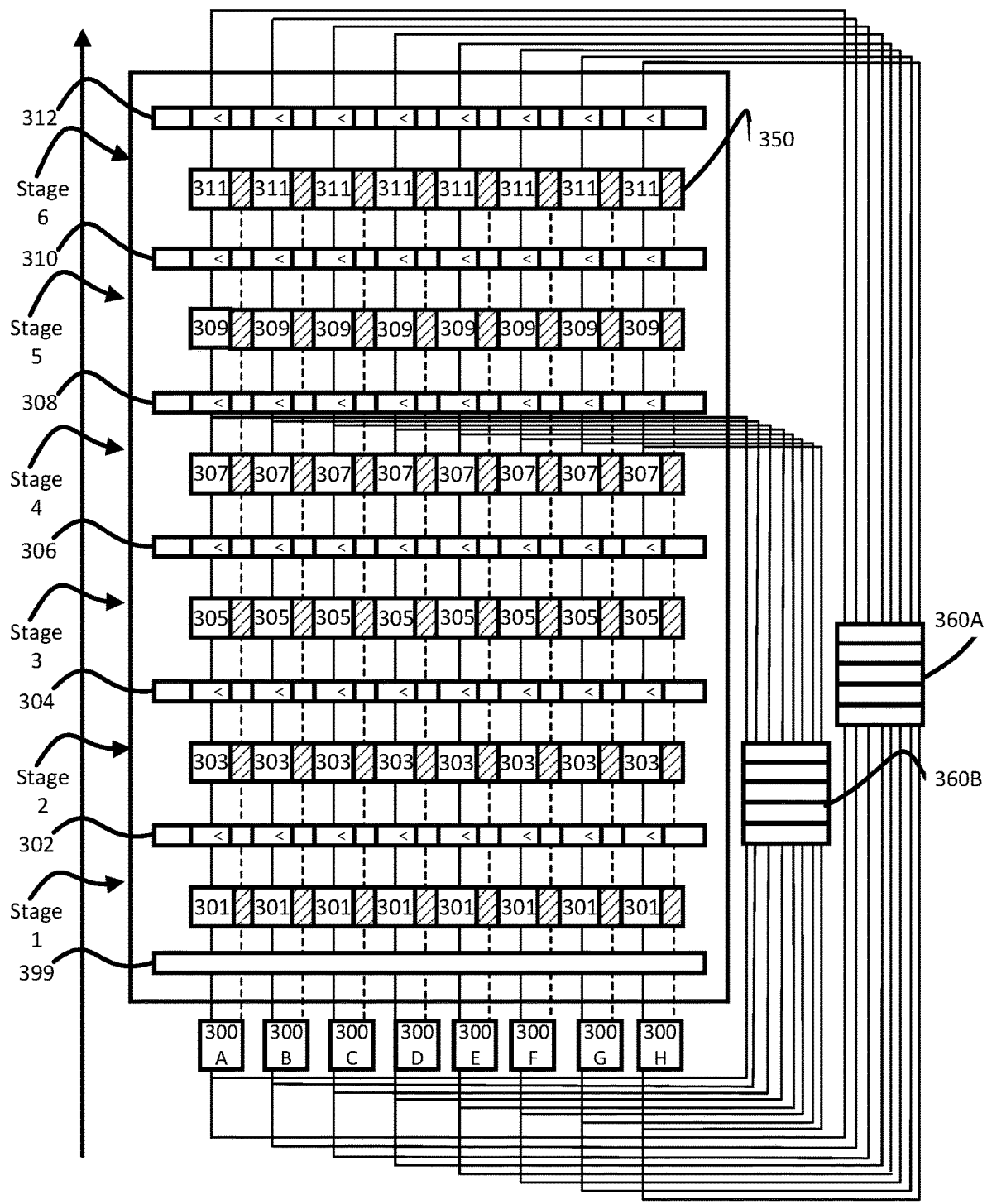
FIG. 3 depicts a block diagram of an example XPU according to aspects of the disclosure.

FIG. 3 is a block diagram of an example XPU 300. The XPU 300 includes processing cells 301-309, crossbars 203-310, and control cells 350. The control cells 350 are represented by hatched blocks in the block diagram of FIG. 3. Data flows from the bottom up along data processing lanes 300A-H, beginning at stage 1 and ending at stage 6. Stage 1 includes processing cells 301 and crossbar 302. Stage 2 includes processing cells 303 and crossbar 304. Stage 3 includes processing cells 305 and crossbar 306. Stage 4 includes processing cells 307 and crossbar 308. Stage 5 includes processing cells 309 and crossbar 310. Stage 6 includes processing cells 311 and crossbar 312. In different examples, an XPU can include more or fewer stages. The XPU can also include a crossbar 399.

Earlier stages are considered "upstream" to later stages, and later stages are considered "downstream" to earlier stages for purposes of description. For example, stage 1 is upstream to stage 5, stage 4 is downstream to stage 3.

The crossbar at each stage of the XPU can be any type of circuitry configured for permuting different input values from respective lanes to different other processing lanes according to the current configuration of the crossbar. The crossbar can receive one or more control signals from control cells for each processing cell in the same stage as the crossbar. The crossbar is configured to permute input values from each processing cell in the same stage according to a fixed pattern. The pattern depends on the composed operation the XPU is currently configured to perform and does not necessarily cause the crossbar to permute every processing cell output. In other words, some processing cell outputs may bypass the crossbar and proceed to the next stage along the same processing lane.

For configuring the processing cell, each processing cell of the XPU 300 has a respective control cell 350 configured to receive one or more control signals along a respective processing lane on which the processing cell resides. The processing cell is configured with circuitry to perform various different primitive operations and perform those operations in accordance with control signals or instructions received, as described in more detail with reference to FIG.

4. The control cell receives instructions along a data processing lane, for example as one or more signals interpretable by the control cell for determining which primitive operation its corresponding processing cell is to perform. The control cell can forward the control signal(s) to the processing cell, or process received instructions or signals and forward generated control signals that the processing cell is configured to receive for enabling or disabling the execution of specified primitive operations.

Figure 4:
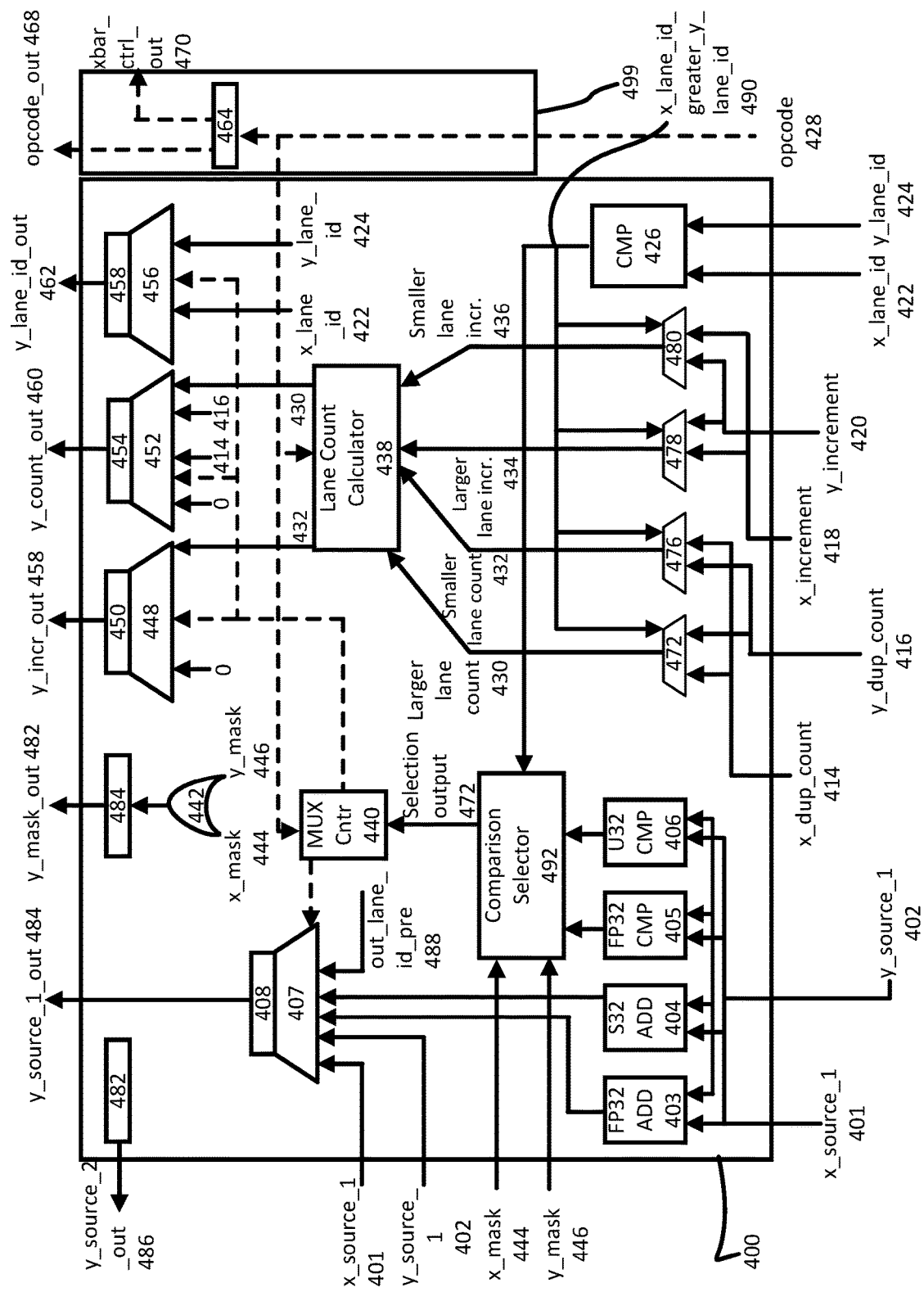
FIG. 4 depicts a block diagram of an example XPU processing cell and a corresponding control cell according to aspects of the disclosure.

Processing cells can also be configured to bypass input data received from a respective processing lane for the processing cell. When bypassed, the input received is passed from the processing cell to the crossbar in the same stage as the processing cell, without modification. The input received from the crossbar of the previous stage by the bypassing processing cell can be tied to zero or ignored. The actual behavior of the bypassing processing cell can depend on the pipeline stage the cell is in, and/or the processing lane the processing cell is in. FIG. 4 shows an example processing cell configured to perform comparison, arithmetic, and/or bypass primitive operations.

The XPU 300 can be configured to receive instructions defined as part of an instruction set architecture or an extension to the instruction set architecture of which the processor implementing the XPU 300 is configured to apply and execute. The instructions can specify different composed and/or primitive operations the XPU and individual processing cells are configured to execute as corresponding operations, respectively. Control cells 350 are configured to receive data representing instructions defined as part of the instruction set or extension and/or convert the instructions into control signals for configuring corresponding processing cells. For example, control cells 350 can receive signals as opcodes, code words for operations the XPU is configured to perform, of an instruction set corresponding to the processor or hardware circuit implementing the XPU 300. If the XPU 300 receives instructions for performing composed operations, such as vector sorting or vector duplicate counting, the XPU 300 can configure each processing cell to perform a predetermined respective primitive operation that causes the XPU to perform the instructed composed operation.

Operations performed by the XPU can be synchronized by clock cycle. For example, operations performed by processing cells in each stage can be performed in one or more cycles. For example, operations in each stage can be performed in a single cycle. Different composed operations performed by the XPU can take different amounts of clock cycles to perform. For example, vector sorting can be performed by the XPU in six cycles, vector prefix summation in four cycles, and vector compact in two cycles.

As described in more detail with respect to FIG. 4, processing cells can be configured for performing arithmetic operations, such as addition between operands of different types, including floating-point values and signed or unsigned integers. Arithmetic operations such as addition may form part of composed operations performed by the XPU for scanning operations, as described herein with reference to FIG. 5.

Example instructions include instructions for resetting the XPU and retrieving information about clock synchronization as well as composed and primitive operations performed by the XPU. Other instructions include instructions for retrieving one or more of operands, mask values, and/or segment markers from each processing lane. The instructions can include instructions for accessing a data structure stored by the XPU with control information specifying each of a variety of different composed operations supported by the XPU. In yet further examples, the instructions can include instructions for causing the XPU to push data to various registers, latches, or flip-flops, and determining whether the contents of the aforementioned are valid. The pushed data can include, for example, values being processed as part of performing a composed operation, and/or mask values.

A configured XPU 300 is said to implement a processing network for performing a particular composed operation. For example, the XPU 300 includes 48 XPU cells, which can be configured as follows: 18 cells can be configured for arithmetic operations, 38 cells are configured for comparing input values (one cell may be configured for both arithmetic and comparison operations), and 10 cells are configured to bypass input. In response to new instructions, the XPU 300 can reconfigure itself with a new processing network, to perform a different composed operation.

The XPU can be configured to operate in a variety of different operating modes, which can be specified as different instructions in an instruction set or extension. The different operating modes can include different composed operations for sorting, counting duplicates, identifying unique values, scanning, partitioning the data, and/or identifying unique values in data input to the XPU. Further, the instructions can include operands specifying the type of comparison or arithmetic operation to perform, for example unsigned integer comparison for sorting or scanning, or floating-point addition. Other operands to instructions for performing composed operations include specifying from which processing lane the output of the composed operation is to emerge from the XPU 300. Other operands received can include segment markers for performing composed operations on segments of the input data, for example for sorting each of multiple segments of data received by the XPU 300 across the data processing lanes.

When performing vector sort and/or vector duplicate count, the XPU 300 is configured to include an odd/even merge network, and a value shuffle network. Example network configurations are shown and described with reference to FIGS. 4-8G. The network configurations include one or more stages of the XPU, with respective cells and crossbars of each stage configured to perform one or more primitive operations. After sorting the vector, the XPU 300 can identify and remove non-unique values in the input vector, leaving only unique values, e.g., values appearing only once in the processed input vector.

The XPU 300 can include register files 360A and 360B. The register files 360A-B can be coupled to the data processing lanes 300A-H between different stages and used to store and retrieve data. For example, some data may be stored in register file 360B after the processing cells 307 in stage 4, while data output by the XPU 300 is stored in register file 360A.

FIG. 4 is a block diagram of an example XPU processing cell 400 and a corresponding control cell 499. The processing cell 400 can be configured to execute a number of primitive operations as described herein, based on a control signal. The control signal can represent an opcode forming part of the instruction set for programming the XPU.

The XPU processing cell 400 is an example of a possible circuit implementation of an XPU processing cell. In different examples, an XPU processing cell 400 can include more or fewer components for implementing a circuit configured to perform different primitive operations. In some examples, an XPU processing cell 400 may include a circuit configured only for a subset of primitive operations. In other examples, the XPU processing cell may include a circuit configured to perform all of the primitive operations, sequentially or in parallel.

Each processing cell can also receive an input tuple of values. Values passed can be individual values, such as integers or floating-point values, or groups of values, such as tuples or lists of integers or floating-point values, etc.

Source inputs include x_source_1 401 and y_source_1 402, collectively "source inputs". Source inputs can include elements of vectors processed by the XPU, as described herein. The source inputs can pass through one or more of a 32-bit floating point adder (FP32 ADD) 403, a 32-bit signed integer adder (S32 ADD) 404, a 32-bit floating point comparator (FP32 405), and a 32-bit signed integer comparator (U32 CMP) 406. The adders 403, 404 can compute the sum of the source inputs and pass the output sum to a multiplexer 407. The comparators 405, 406 compare input values and pass the largest/smallest value as output to a comparison selector 492.

A comparison selector 492 can receive the outputs of the compactors 405, 406, as well as mask values x_mask 444 and y_mask 446. The mask values can be used as part of certain composed operations, described herein, for masking some or all input received by the processing cell 400.

The comparison selector 492 selects an input and passes the input as selection_output 472, to a multiplexer controller 440. The comparison selector 492 can also receive output from a comparator (CMP 426). The comparator 426 can receive the lane identifiers x_lane_id 422 and y_lane_id 424 and compare the lane identifier to determine the larger of the two. The comparator 426 can also pass its output to multiplexers 472, 476, 478, and/or 480. The output from the comparator 426 can be a Boolean value indicating whether the lane identifier for the x lane is greater than the lane identifier for the y lane (referred to as x_lane_id_greater_y_lane_id 490). The selection_output 472 can be determined based on the configuration of the comparison selector 492, described herein with reference to FIG. 8A.

Multiplexer 407 can receive the sum(s) of the adder(s) 403, 404, and/or the source inputs 401, 402 directly (for example, if the processing cell 400 is configured for performing a bypass). The output of the multiplexer 407 can be stored in register 408 and passed as output to the processing cell as y_source_1_out 484. The multiplexer 407 can also receive the previous output lane identifier from which the "x" data is sourced, as out_lane_id_pre 488.

Multiplexers 472 and 476 can receive values representing duplicate counts, as x_dup_count 414 and y_dup_count 416. As described herein with reference to FIG. 8A, the processing cell 400 can be configured to compute duplicate counts of values of an input vector, for instance while sorting an input vector. Increment values x_increment 418 and y_increment 420 can also be received by multiplexers 478 and 480, and are values used as part of performing duplicate count with an odd/even merge network, according to aspects of the disclosure and as described herein with reference to FIG. 8A.

Values 430, 432, 434, and 436 are passed to a lane count calculator 428. The lane count calculator 428 can compute a count of duplicate values across the input data processing lanes x and y, using a value representing the larger lane count of the input lanes (larger_lane_count 430), a value for the smaller lane count of the input lanes (smaller_lane_count 432), the larger value of the increment values 418, 420 (larger_lane_incr 434), and the smaller of the increment values 418, 420 (smaller_lane_incr 436). Example implementations of the lane count calculator 428 are described herein with reference to FIG. 8A and "MAX" cells.

The XPU processing cell 400 can generate a number of outputs, sent to the crossbar of the same stage as the processing cell 400. Register 482 can hold an output value, (y_source_2_out 486), for example a bypassed input value from the processing lane y. The mask values 444, 446 can pass through a logical OR circuit 442, and the output of which can be stored in register 487. The processing cell can output a mask value for the processing cell as y_mask_out 482.

Multiplexer 448 can receive a default value 0, and the smaller_lane_count 432 from the lane count calculator 438 and output an increment value (y_incr_out 458). The output to multiplexer 448 can be stored in register 454. Multiplexer 452 can receive a default value 0, and duplicate counts 414, 416, and output a count value (y_count_out 460) for the processing cell 400. The output to the multiplexer 452 can be stored in register 454. Multiplexer 456 can receive lane identifiers 422 and 424 and output a lane identifier (y_lane_id_out 462). The output to the multiplexer 456 can be stored in register 458.

The dashed lines in FIG. 4 indicate control signals passed through the processing cell 400 and the control cell 499. The control cell 499 can receive an instruction, for example as an opcode 428. The control cell 499 sends instructions, for example as control signals, to the multiplexer controller 440 and the lane count calculator 438. The multiplexer controller 440 is configured to send signals to the multiplexers 407, 448, 452, and 456, based on the received instruction. Output of the lane count calculator 438 is also based on the received signal from the control cell 499. The instructions sent to the XPU cell 400 by the control cell 499 can depend on the stage and lane of the XPU cell 400.

Each of the multiplexers 407, 448, 452, and 456 can be configured according to instructions received, for example as control signals, from the multiplexer controller 440. Depending on the signals received, the multiplexers 407, 448, 452, and 456 output different values from the received input.

In addition to sending instructions to the processing cell 400, the control cell 499 can also pass the opcode 428 downstream (as opcode_out 468) and send an instruction to a downstream crossbar in the same stage as the control cell 499 (as xbar_ctrl_out 470). The instructions sent to the crossbar can cause the crossbar to permute received input according to a fixed pattern. Each control cell of an XPU may receive a different opcode and configure a corresponding processing cell to perform one or more primitive operations as described herein.

Figure 5:
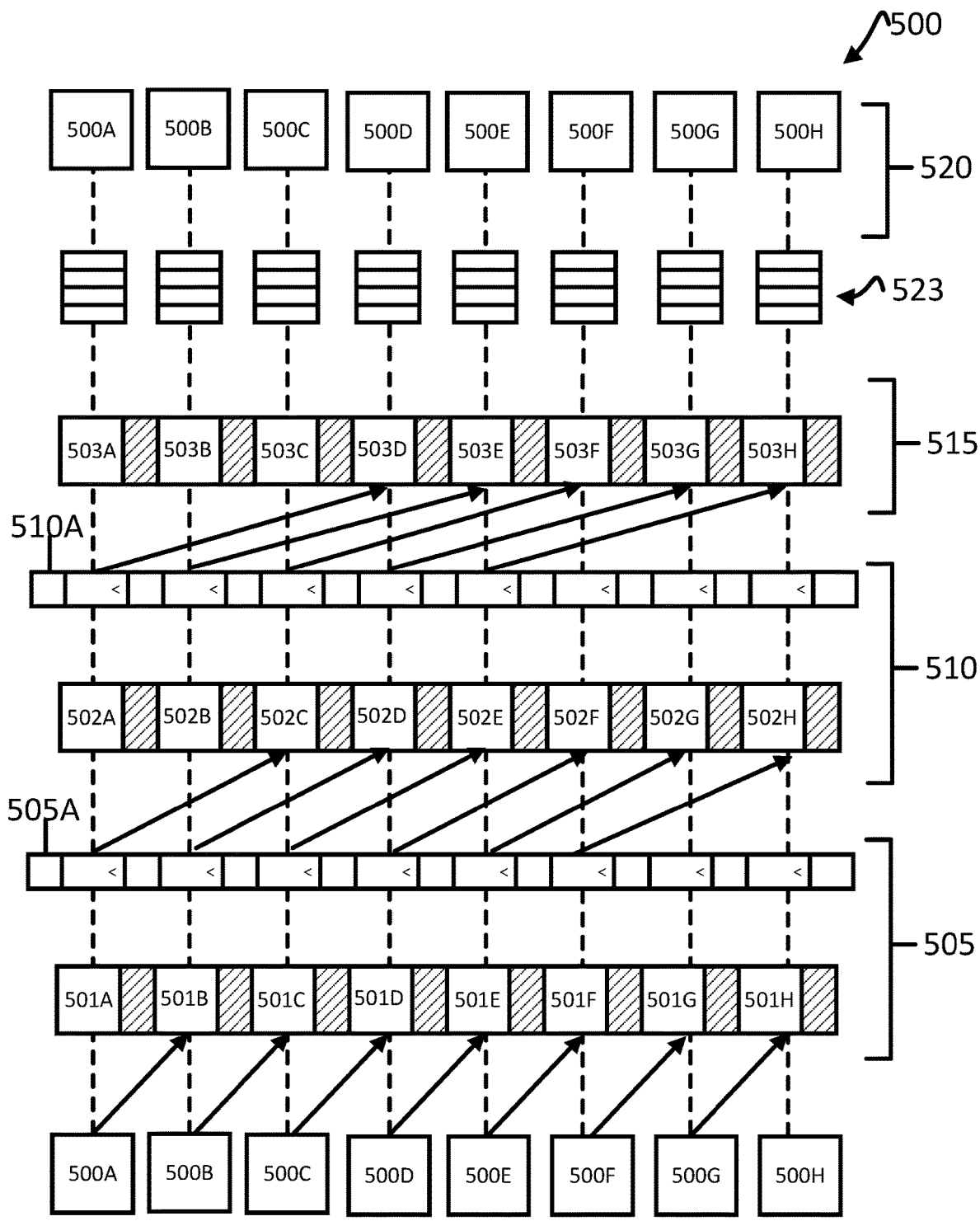
FIG. 5 depicts a block diagram of an example XPU configuration for vector scan operations performed by the XPU according to aspects of the disclosure.
Figure 6:
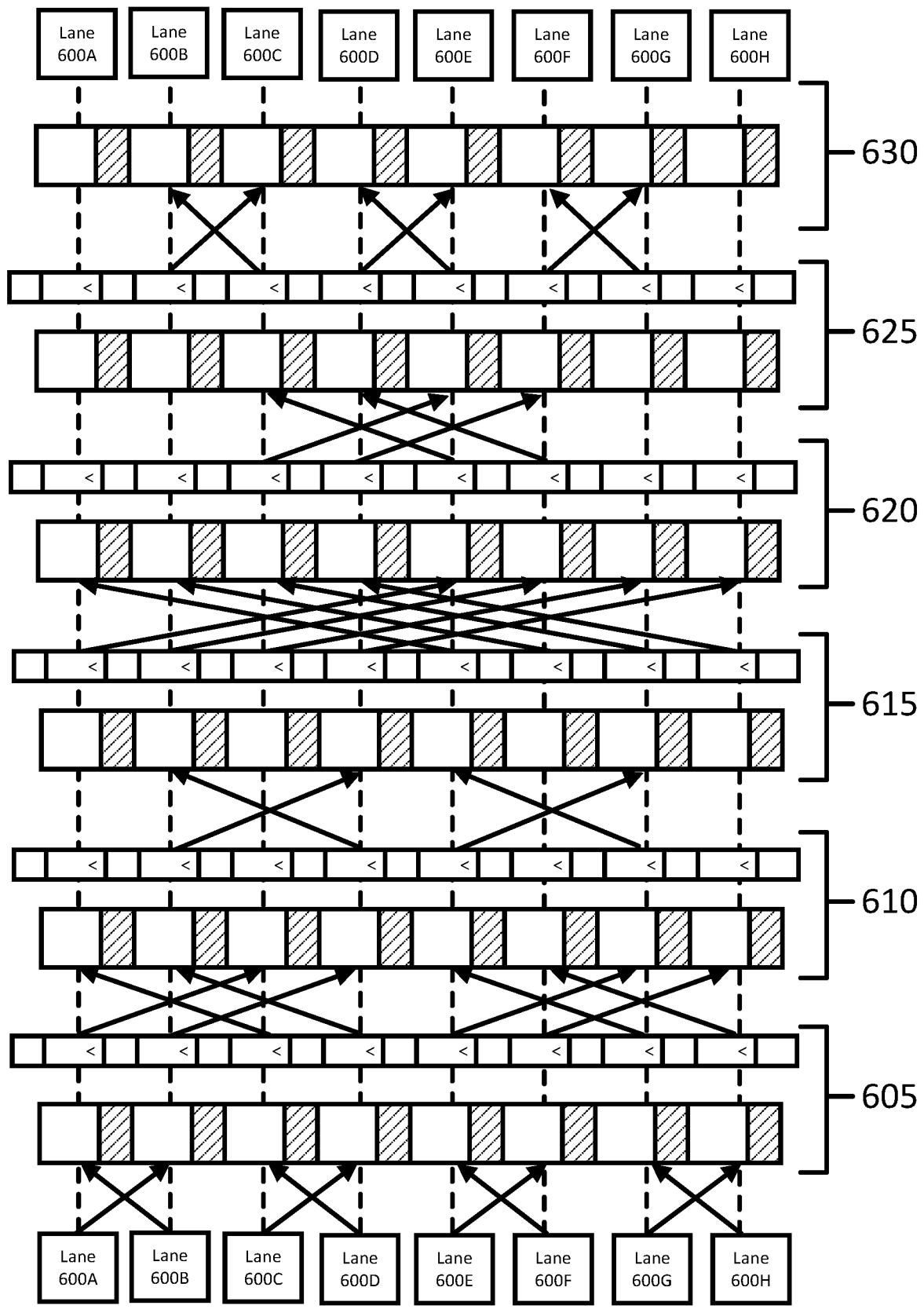
FIG. 6 depicts a block diagram of an example XPU configuration for vector sort and vector duplicate count operations performed by the XPU according to aspects of the disclosure.

The configured processing cells and crossbar form a processing network for performing a composed operation, examples of which are provided herein with reference to FIGS. 5-6.

Although registers are described in FIG. 4, in some examples the processing cell 400 can use any of a variety of circuits for temporarily storing data, for example from a multiplexer or arithmetic or comparison circuit. A register can include one or more flip-flops or latches.

Example Methods

Vector Scan and Vector Segmented Scan

FIG. 5 is a block diagram of an example XPU configuration 500 for vector scan operations performed by the XPU, according to aspects of the disclosure. A vector scan is a rolling sum of elements in an input vector. An XPU when configured using the configuration 500 can output a vector where each element is the rolling sum of the elements in the input vector up to the index of the element. For example, the first element of the output vector is equal to the first element of the input vector; the second element of the output vector is equal to the sum of the first element of the input vector plus the second element of the input vector; the third element of the output vector is equal to the sum of the first, second, and third element of the input vector, and so on.

The configuration 500 can also be used for vector segmented scans, in addition to vector scans. The configuration 500 receives a set of mask bits to determine the segments of the vector. The XPU cells receive the mask bits and are configured to bypass or translate data to a downstream XPU cell, depending on whether that XPU cell receives an input element in the same segment as the value of a respective XPU cell in receipt of the mask bits.

The configuration 500 shows crossbars permuting an output tuple, for example y_source_1_out, y_mask_out, y_incr_out, y_count_out, and y_lane_id_out as shown in FIG. 4, from different lanes of a previous stage to the input tuple, for example x_source_1, x_mask, x_incr, x_count, and x_lane_id in the current lane. In FIG. 5, the dotted lines represent data streamed down processing lanes 500A-H. The solid lines represent how data is permuted between stages in the configuration 500. The configuration 500 is a four-cycle configuration. When implemented on an XPU with more than four crossbars, the crossbars in stages not used as part of the configuration 500 can be configured to bypass data through each lane.

Beginning at stage 505, the input element in lane 500A is bypassed, and each element in lanes 500A-G is passed to a respective cell 501B-H. Cell 501A bypasses the input element from lane 500A to the next stage. Cells 501B-H sum the input element from the shifted lane with the input element of the lane on which each respective cell resides. The output of each of cells 501A-H is passed downstream.

At stage 510, the input elements of lanes 500A-E are permuted to a respective lane two-away from the lane of the input element, from crossbar 505A. Cells 502A and 502B bypass the received input downstream to the next stage. Cells 502C-G sum the input element of their respective lanes, with a respective permuted input element. The output of each of cells 502A-H is passed downstream.

At stage 515, the cells 503A-C bypass their input to registers 523 on the respective lane of each cell. Cells 503D-H receive shifted input from a crossbar 510A and from a lane three-away relative to the respective lane. The cells 503D-H generate a sum with the input element of their respective lane and the received shifted input. The output of each cell 503A-H is passed downstream into registers 523, and subsequently as part of an output vector of the XPU.

At stage 520, Output data from stage 515 can be temporarily stored in register files 523, before being passed as output downstream of the XPU.

Vector Sort and Vector Duplicate Count

FIG. 6 is a block diagram of an example XPU configuration 600 for vector sort and vector duplicate count operations performed by the XPU, according to aspects of the disclosure. The configuration 600 has six stages, 605-630.

To perform a vector sort, the XPU can receive tuples of keys and values. Example input can be:
  keys={5, 5, 10, 1, 512, 8, 1023, 650}
  values={a, b, c, d, e, f, g, h}
Example output by the XPU for performing a vector sort with the example input, above, is:
  keys={1, 5, 5, 8, 10, 512, 650, 1023}
  values={d, a, b, f, c, e, h, g}

In the event of ties, the key sourced from higher-numbered VPU lane is selected as the larger of the tied values. For example, in the event of a tie between lanes 0 and 1, the key from lane 1 is selected as coming from the higher-numbered VPU lane.

To perform a vector duplicate count, the XPU can receive a vector of values, and generate, as output, a vector wherein each element corresponds to the number of times a unique value appears in the input vector up to that element.
Example Input can be:
  values={10, 5, 10, 5, 10, 5, 5, 10}
Example Output can be:
  count={1, 1, 2, 2, 3, 3, 4, 4}

At each stage, processing cells are configured as MIN or MAX cells and form part of an odd/even merge sort network and value shuffle network, described in more detail with reference to FIGS. 7 and 8A-H. The configuration 600 is a six-stage configuration. If the XPU implementing the configuration has more than six crossbars, the remaining crossbars can be set to bypass input elements. According to aspects of the disclosure, the same XPU configuration 600 allows for sorting vector elements while generating a count of duplicate elements for each vector. The streaming of data across cells and crossbars of the XPU configured for vector sorting and duplicate counting is described with reference to FIGS. 7 and 8A-H.

The resulting output vector can be further processed to remove non-unique instances of values. Given the duplicate count and the sorted list, the XPU can iterate through the list and remove non-unique values, to generate example output such as:
  unique values={1, 2, 3, 4}

Because the XPU configuration 600 allows for both sorting and duplicate counting, the XPU can further generate a "uniquified" output vector including only a single instance of each value present in the input vector.

Figure 7:
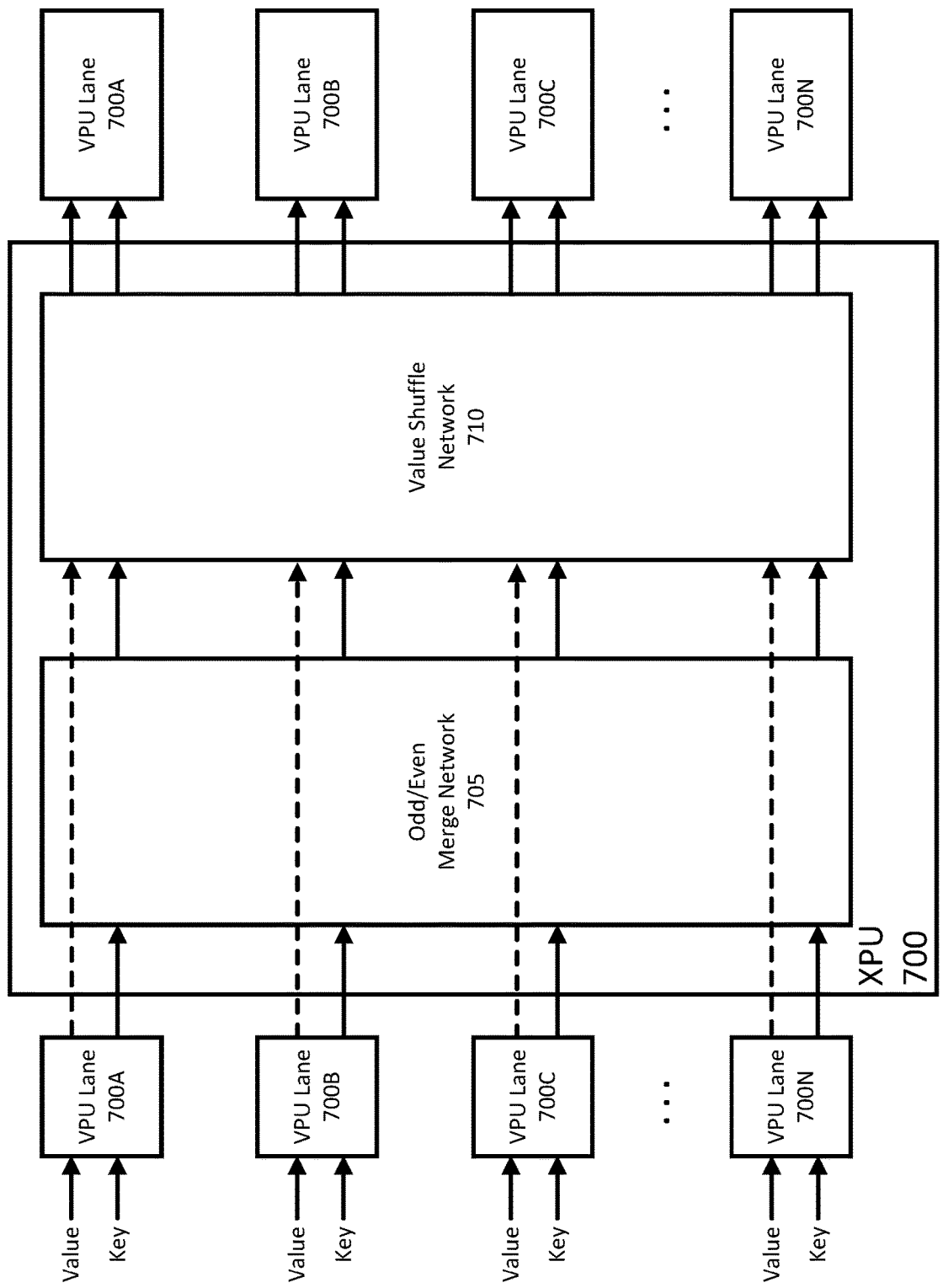
FIG. 7 depicts a block diagram of an example XPU configured to include an odd/even merge network and a value shuffle network according to aspects of the disclosure.

FIG. 7 is a block diagram of an example XPU 700 configured to include an odd/even merge network 705 and a value shuffle network 710. Tuples of keys and values pass through VPU lanes 700A-N and into the odd/even merge network 705, where the keys are sorted. The XPU 700 includes eight data processing lanes, but in other examples the XPU 700 may have fewer or more data processing lanes, for example, a number of data processing lanes equal to a power of two. In those examples, the odd/even merge network 705 and value shuffle network 710 are expanded or condensed accordingly and without loss of generality.

The values do not move with the keys in the sorted network 705, indicated by dotted lines through the sorted network 705, but instead pass through directly to the value shuffle network 710 to be re-arranged with their corresponding keys. Although the elements of the input vectors are described as key-value tuples, it is understood that any type of data that can be compared can be received as input to the XPU, such as integer values, floating point values, etc.

In some examples, Batcher's odd/even merge sort can be implemented in the odd/even merge network 705. As described herein with reference to FIG. 8A, the odd/even merge network can include a number of stages for processing the input key-value tuples and sorting the tuples by key.

After the tuples are sorted by key, the value shuffle network 710 shuffles the values to the lanes corresponding to their associated keys. The value shuffle network 710 can be an 8×8 32-bit crossbar. The input to the crossbar is a 32-bit value and a lane identifier. The value shuffle network 710 can support multiple modes, depending on the lane identifier. For example, the value shuffle network 710 is configured to route a 32-bit value from a corresponding source lane when the source lane identifier is provided. In another mode, the destination lane identifier is used to route a 32-bit value to the appropriate output lane. For vector sorting, the value shuffle network 710 can be set to source lane identifier mode, while in vector duplicate counting, as described herein, the value shuffle network 710 is set to destination lane identifier mode. For vector duplicate counting, the value shuffle network 710 shuffles count values with their corresponding values. The operation mode can be specified as one or more signals carrying instructions provided by control cells of the XPU.

Figure 8A:
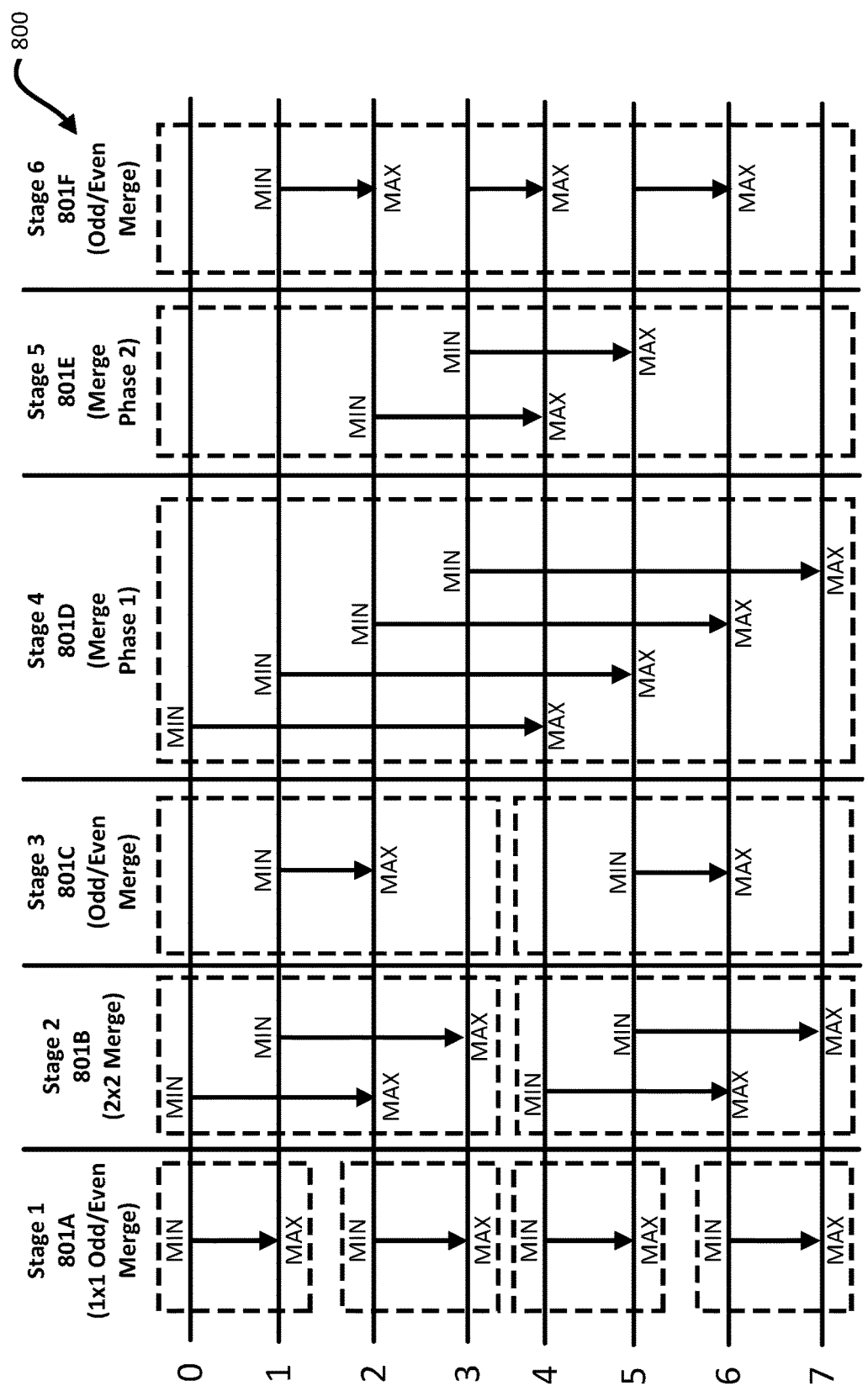
FIG. 8A depicts a flow diagram of an example XPU configuration of the odd/even merge sort network for performing a combined merge sort and duplicate count according to aspects of the disclosure.

FIG. 8A is a flow diagram of an example XPU configuration 800 of the odd/even merge sort network 705 for performing a combined merge sort and duplicate count. The example XPU has eight processing lanes labeled 0 through 7. The odd/even merge sort network 705 has six stages. The six stages are: stage 1 801A (1×1 Odd/Even Merge), stage 2 801B (2×2 Merge), stage 3 801C (2×2 Odd/Even Merge), stage 4 801D (Merge Phase 1), stage 5 801E (Merge Phase 2), and stage 6 (Odd/Even Merge) ("stage 1," "stage 2," "stage 3," "stage 4," "stage 5," and "stage 6," respectively).

At each stage, processing cells of the XPU are configured to perform a primitive operation for determining the minimum of two input operands and returning the smaller operand with the lane identifier of the data processing lane from which the smaller operand was received. At each arrow indicated in FIGS. 8A-H, the XPU includes processing cells configured for comparing input operands. A processing cell configured for determining the minimum of two input operands is referred to as a MIN cell, while a processing cell configured for determining the maximum of two input operands.

An example pseudocode implementation of a MIN cell is shown in TABLE 1. For this and other example pseudocode may refer to variables and input/output values as shown and described with reference to FIG. 4.

TABLE 1

| 1 | x_less_than_y_ordered = |
|---|---|
|   | (x_equal_y and not |
|   | x_lane_id_greater_than_y_lane_id) or x_less_than_y |
| 2 |   |
| 3 | if x_less_than_y_ordered: |
| 4 | out = x |
| 5 | out_lane_id = x_lane_id |
| 6 |   |
| 7 | else: |
| 8 | out = y |
| 9 | out_lane_id = y_lane_id |

As shown in TABLE 1, x and y are values passed through corresponding lanes having lane identifiers x_lane_id and y_lane_id, respectively. For example, in stage 1, lane 0 can pass value x, and lane 1 can pass value y. In line 1 of TABLE 1, the variable x_lessa_than_y_ordered is a Boolean value. The variable is true under two conditions. First, the variable is true when the values x and y are equal to each other, and the lane identifier for the lane having the x value is not greater than the lane identifier for the lane having the y value. This condition is set for breaking ties when x is equal to y, by setting the lane with the lower lane identifier as the minimum of the compared values. Second, the variable is true if the value x is less than the value y. If the variable x_less_than_y_ordered is true, then in lines 3 through 5, the MIN cell outputs x as the minimum value of x,y, and also outputs the x_lane_id lane identifier. Otherwise, as shown in lines 7 through 9, the MIN cell outputs y_and_lane_id.

The processing cells can also be configured to perform a primitive operation for determining the maximum of two input operands and are referred to as MAX cells. In both primitive operations, one operand comes from the data processing lane for the respective processing cell, while the second operand is provided through a crossbar from another data processing lane.

An example pseudocode implementation of a MAX cell is shown in TABLE 2:

TABLE 2

| 1 | x_greater_than_y_ordered = |
|---|---|
|   | (x_equal_y and x_lane_id_greater_than_y_lane_id) |
|   | or x_greater_than_y |
| 2 |   |
| 3 | if x_greater_than_y_ordered: |
| 4 | out = x |
| 5 | out_lane_id = x_lane_id |
| 6 |   |
| 7 | else: |
| 8 | out = y |
| 9 | out_lane_id = y_lane_id |

In line 1 of TABLE 2, the variable x_greater_than_y_ordered is a Boolean value that is true when: the value x is equal to the value y and the lane identifier for the lane corresponding to the value x is greater than the lane identifier for the lane corresponding to the value y; or, when the value x is greater than the value y. The MAX cell outputs x and the lane identifier x_lane_id when x_greater_than_y_ordered is true and outputs y and the lane identifier y_lane_id otherwise. The first condition is a tiebreaker in the case of the value x being equal to the value y.

To configure the odd/even merge sort network to also obtain duplicate counts for input elements, the MAX cells in the various stages are configured as described presently. The modifications to the MAX cells for implementing duplicate count do not substantially add to timing and logic complexity, and in some examples can be enabled or disabled based on the current workload processed by the XPU. By combining vector sort and duplicate count operations as part of the same configuration of the XPU, the XPU can more efficiently obtain values for both operations without separately configured hardware and/or re-configuring the XPU between operations. The MAX cell performs different operations depending on whether the MAX cell is part of an odd/even merge stage, in which odd and even elements are compared and sorted, or an odd-odd/even-even merge, in which odd elements are compared separately from even elements. In the following description, the term "value" is used generally to refer to the elements being sorted. As shown and described with reference to FIGS. 8B-H, the value sorted can be keys of tuples of key-value pairs.

In 1×1 odd/even merge stage 1, adjacent elements are compared to form four sorted lists of length two, shown by four dashed boxes in stage 1. In 2×2 odd-odd/even-even merge stage 2, odd elements of adjacent sorted lists are compared. Even elements of the adjacent sorted lists are also compared, shown by two dashed boxes in stage 2. Stage 3 is a 2×2 odd/even merge stage, in which each $i^{th}$ element is merged with the $i+1^{th}$ element. Stages 4 and 5 are phases 1 and 2 of a 4×4 odd-odd/even-even merge. In stage 4, the first set of odd elements of adjacent sorted lists are compared. The first set of even elements are also compared. In stage 5, the second set of odd elements of adjacent sorted lists are compared. The second set of even elements are also compared. Stage 6 is a 4×4 odd/even merge phase, in which the $i^{th}$ element is sorted with the $i+1^{th}$ element. The output of stage 6 is one sorted list of length 8. After sorting, the sorted tuples by key pass through a value shuffle network to shuffle the counts computed by the XPU to their corresponding keys. Each stage is described in more detail with reference to FIGS. 8B-H.

In stage 1, the XPU compares the values in lanes 0, 1, 2, 3, 4, 5, 6, and 7. The dashed blocks in stage 1 of FIG. 8A represent four sorted lists after the XPU sorts the values of the pairs of adjacent lanes. If the value in the lower-numbered lane is higher than the value in the higher-numbered lane, then the XPU swaps the values between the lanes. For output lane 1, the count $C_l$ is the sum of values passing through a set of lanes that have the same value as the value in lane 1. The set of lanes $S_l$ includes lanes whose identifier is less than or equal to the current lane. For example, the set $S_l$ for lane 5 may include lanes 1-4, but not lane 6.

For computing duplicate count, the MAX cells in stage 1 can be configured to set a count of the upper lane to one more than the count of the lower lane. The upper and lower lanes can be decided based on the VPU lane sourcing the value whose count is incremented. An example pseudocode implementation for implementing sort and duplicate count in an odd/even merge stage is shown below in TABLE 3:

TABLE 3

| | |
|---|---|
| 1 | x_greater_than_y_ordered = (x_equal_y and x_lane_id_greater_than_y_lane_id) or x_greater_than_y |
| 2 | |
| 3 | if x_lane_id_greater_than_y_lane_id: |
| 4 | count_large = x_count |
| 5 | count_small = y_count |
| 6 | |
| 7 | else: |
| 8 | count_large = y_count |
| 9 | count_small = x_count |
| 10 | |
| 11 | count_large = count_small + 1 |
| 12 | |
| 13 | if x_greater_than_y_ordered: |
| 14 | out = x |
| 15 | out_lane_id = x_lane_id |
| 16 | out_count = count_large if x_equal_y else x_count |
| 17 | |
| 18 | else: |
| 19 | out = y |
| 20 | out_lane_id = y_lane_id |
| 21 | out_count = count_large if x_equal_y else y_count |

In TABLE 3, the MAX cell determines the Boolean value of the variable x_greater_thanmyordered, according to line 1. According to lines 3 through 9, the MAX cell first determines if the x_lane_id identifier is larger than the y_lane_id for lanes streaming the values x and y, respectively. If variable x_lane_id_greater_than_y_lane_id is true, the MAX cell sets a count_large variable to the count variable x_count of the lane streaming the value x, and sets a count_small variable to the count variable y_count of the lane streaming the value y. Otherwise, as shown in lines 7 through 9, the variable count_large is set to y_count and the variable count_small is set to x_count.

According to line 11, the MAX cell increments the value for the variable count_large.

According to lines 13 through 21 and based on the value for the variable x_greater_than_y_ordered, the incremented count_large variable is output whenever the input values x and y are equal (lines 16, 21), or the respective count of the larger of the two values, otherwise. For example, out_count=x_count in line 16 is output if the predicate x_equal_y is not true in line 16 and x_greater_than_y_ordered is true. Similarly, out_count=y_count in line 16 is output if the predicate x_equal_y is not true in line 16 and x_greater_than_y_ordered is not true.

Stage 2 is a 2×2 odd-odd/even-even merge stage. Odd elements of adjacent sorted lists from the four sorted lists from stage 1 are compared and swapped if needed. As shown in FIG. 8A, the value of lane 0 is compared with the value of lane 2, the value of lane 1 is compared with lane 3, the value of lane 4 is compared with lane 6, and the value of lane 5 is compared with lane 7.

In an odd-odd/even-even stage, the count $C_l$ for an even lane l (for example lane 0, lane 2, lane 4, etc.) is the sum of values in a set of lanes $S_1$. The set of lanes is defined as the lanes having the same value $V_f$ as the lane 1 and on even lanes less than or equal to the current lane. To compute the duplicate count for a lane 1 in a 2×2 odd-odd/even-even merge stage, the MAX cell adds the counts of equal values in compared lanes and assigns the sum to the upper lane. The lower and upper lanes are decided based on the lane that sourced the value being counted.

Stage 3 is a 2×2 odd/even merge stage. The XPU at this stage merges two lists from the previous stage, comparing the values in lanes 1 and 2, and the values in lanes 5 and 6. An example pseudocode implementation for implementing sort and duplicate count in a 2×2 odd/even merge stage is shown below in TABLE 4:

TABLE 4

| | |
|---|---|
| 1 | x_greater_than_y_ordered = (x_equal_y and x_lane_id_greater_than_y_lane_id) or x_greater_than_y |
| 2 | |
| 3 | if x_lane_id_greater_than_y_lane_id: |
| 4 | count_large = x_count |
| 5 | count_small = y_count |
| 6 | |
| 7 | else: |
| 8 | count_large = y_count |
| 9 | count_small = x_count |
| 10 | |
| 11 | count_large = count_large + count_small |
| 12 | |
| 13 | if x_greater_than_y_ordered: |
| 14 | out = x |
| 15 | out_lane_id = x_lane_id |
| 16 | out_count = count_large if x_equal_y else x_count |
| 17 | |
| 18 | else: |
| 19 | out = y |
| 20 | out_lane_id = y_lane_id |
| 21 | out_count = count_large if x_equal_y else y_count |

In TABLE 4, the variable count_large is the sum of the counts from the compared lanes x and y. The MAX cell outputs the count_large variable is output whenever the input values x and y are equal (lines 16, 21), or the respective count of the larger of the two values, otherwise. For example, out_count=x_count in line 16 is output if the predicate x_equal_y is not true in line 16 and x_greater_than_y_ordered is true. Similarly, out_count=y_count in line 16 is output if the predicate x_equal_y is not true in line 16 and x_greater_than_y_ordered is not true.

Stage 4 is a first phase for a 4×4 odd/even merge stage. The set of output lanes can be described as including a set of even lanes and a set of odd lanes. The first phase is similar to merging input sorted lists as described herein with reference to 2×2 odd-odd/even-even merge sort.

Stage 5 is the second phase for the 4×4 odd/even merge. For example, as shown in FIG. 8A, the even lanes to be sorted and merged are lanes {2, 4} and odd lanes to be sorted and merged are {3,5}. The MAX cell is configured to manage and handle multiple duplicate counts that may otherwise have been inadvertently added to an output lane during the 4×4 odd/even merge. The duplicate count on lane 2 can be $C_6$ from lane 6 or $C_2$ from lane 2 (because lanes 2 and 6 are compared during phase 1). The duplicate count on lane 4 can be $C_0$ from lane 0, $C_4$ from lane 4, or $C_4+C_0$. In phase 2, when lanes {2,4} are merged, the possible output combinations are:

| Possible Output | Comment |
| --- | --- |
| $C_6 + C_0$ | Valid |
| $C_6 + C_4$ | $C_4$ should not be added as $C_6 = \Sigma_{F\in\{4,5\}} C_F + 1$ |
| | From odd-even merge stage. |
| $C_6 + C_4 + C_0$ | $C_4$ should not be added as $C_6 = \Sigma_{F\in\{4,5\}} C_F + 1$ |
| | From odd-even merge stage. |
| $C_2 + C_0$ | $C_0$ should not be added as $C_2 = \Sigma_{F\in\{0,1\}} C_F + 1$ |
| | From odd-odd-even-even merge stage. |
| $C_2 + C_4$ | Valid |
| $C_2 + C_4 + C_0$ | $C_0$ should not be added as $C_2 = \Sigma_{F\in\{0,1\}} C_F$ |
| | From odd-odd-even-even merge stage. |

An example pseudocode implementation for implementing duplicate count in an 4×4 odd-odd/even-even merge stage at phase 1 is shown in TABLE 5:

TABLE 5

```
1   x_greater_than_y_ordered =
        (x_equal_y and x_lane_id_greater_than_y_lane_id)
        or x_greater_than_y
2
3   if x_lane_id_greater_than_y_lane_id:
4       count_large = x_count
5       count_small = y_count
6
7   else:
8       count_large = y_count
9       count_small = x_count
10
11  count_large = count_large + count_small
12
13  if x_greater_than_y_ordered:
14      out = x
15      out_lane_id = x_lane_id
16      out_count = count_large if x_equal_y else x_count
17      Out_incr = count_small if x_equal_y else 0
18
19  else:
20      out = y
21      out_lane_id = y_lane_id
22      out_count = count_large if x_equal_y else y_count
23      Out_incr = count_small if x_equal_y else 0
```

The implementation is similar to the 2×2 merge as shown, for example, in TABLE 4, but with a value represented by out_incr latched to the Cm value described above. The out_incr value is used to correct the final duplicate count of the 4×4 odd-odd-/even-even merge stage at phase 2.

An example pseudocode implementation for implementing duplicate count in an 4×4 odd-odd/even-even merge stage is shown below at phase 2 is shown in TABLE 6:

TABLE 6

```
1   x_greater_than_y_ordered =
        (x_equal_y and x_lane_id_greater_than_y_lane_id)
        or x_greater_than_y
2
3   if x_lane_id_greater_than_y_lane_id:
4       count_large = x_count
5       count_small = y_count
6       incr_large = x_incr
7       incr_small = y_incr
8
9   else:
10      count_large = y_count
11      count_small = x_count
12      incr_large = y_incr
13      incr_small = x_incr
14
15  if x_and_y_diff_half:
16      count_large += (count_small – incr_large)
17  else:
18      count_large += incr_small
19
20  if x_greater_than_y_ordered:
21      out = x
22      out_lane_id = x_lane_id
23      out_count = count_large if x_equal_y else x_count
24
25  else:
26      out = y
27      out_lane_id = y_lane_id
28      out_count = count_large if x_equal_y else y_count
```

At lines 3-13, the larger increment value incr_large is set to the increment value of the larger lane, and the smaller increment value incr_small is set to the increment value of the smaller lane. At lines 15-18, the count of the larger lane count_large is adjusted to compensate for the potential added duplicate value from the previous stage 1.

At stage 6 is a 4×4 odd/even merge. Similar to the 2×2 odd/even merge at stage 3, the $i^{th}$ and $i+1^{th}$ elements are compared and merged. The output is one sorted list of length 8.

After stage 6, the value shuffle network shuffles values based on the composed operations performed in the configured XPU. For a vector sort operation, the value shuffle network in source lane mode routes values from their original lane to the appropriate destination lane, based on where the corresponding sorted key ended up after sorting. For duplicate count operations, the value shuffle network in destination lane mode routes the count of each lane from the original lane to the appropriate destination lane, based on where the corresponding counted value ended up after sorting.

In some examples, the XPU can be configured to perform floating point MIN/MAX scans for scanning input for the minimum or maximum values, respectively. The XPU can also be configured for scanning indices of received tuples across the processing lanes, for example to identify the maximum or minimum index. As part of performing composed operations for scanning operations, processing cells can be configured to perform comparisons, for example between floating point values, such as 32-bit floating point values, or between unsigned integers. Primitive operations for comparison may also be used for other composed operations, such as sorting or counting duplicate values, as described herein.

FIGS. 8B-G show each stage of the merge sort network 800A on an example input. The example keys sorted for purposes of description are:
    keys={5, 6, 7, 6, 5, 5, 5, 5}
    lane identifiers={0, 1, 2, 3, 4, 5, 6, 7} Lane identifiers for the lane streaming each respective key is provided for reference.

Figure 8B:
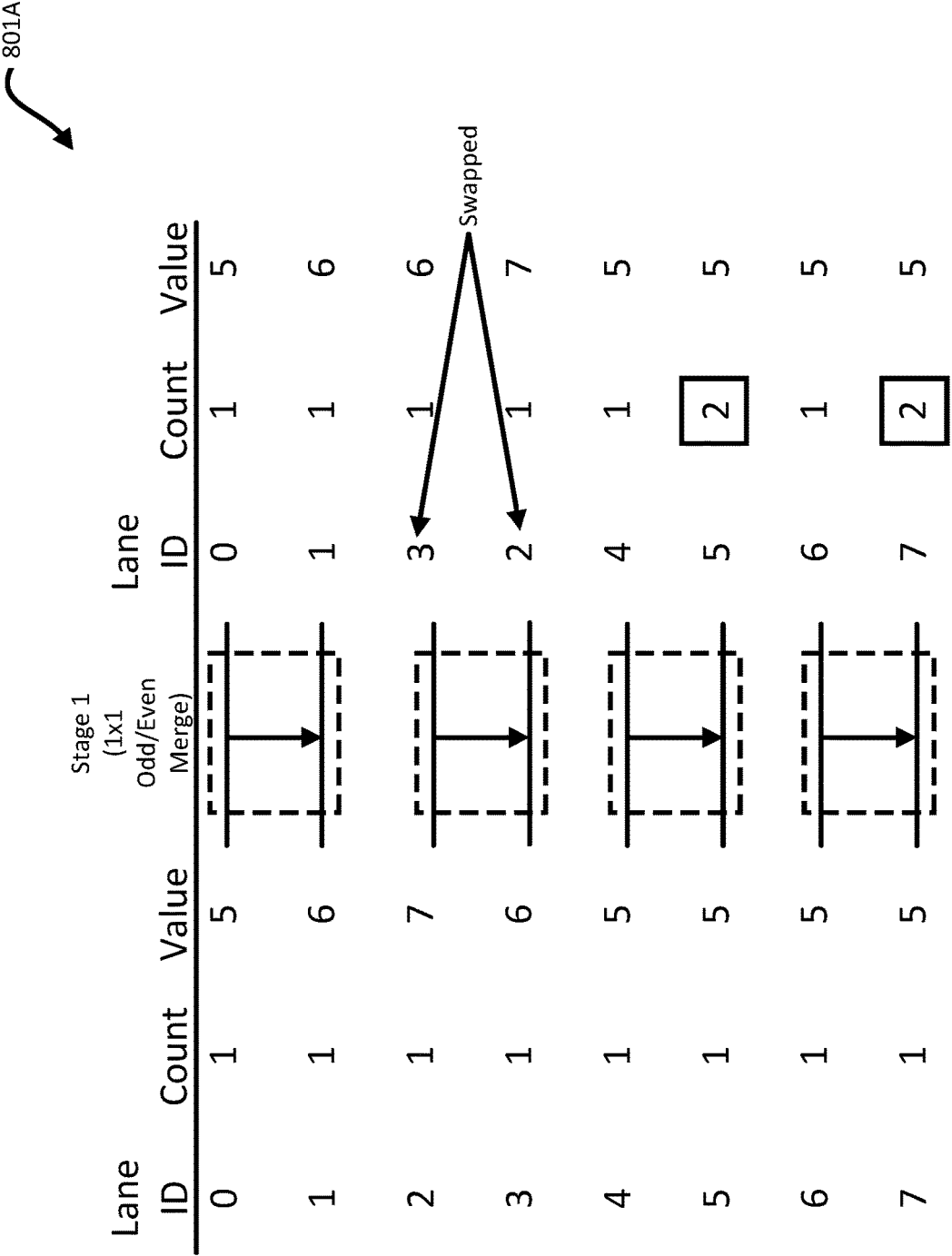
FIG. 8B depicts an example stage 1 of the odd/even merge network 800 of an XPU according to aspects of the disclosure.

FIG. 8B shows an example stage 1 801A of the odd/even merge network 800 of an XPU. In stage 1 801A, keys from adjacent data processing cells are processed by a respective MIN cell and MAX cell. For example, in stage 1, a MIN cell in lane 0 determines the minimum values in lanes 0 and 1, and a MAX cell in lane 1 determines the maximum of keys in lanes 0 and 1. A crossbar in stage 1 is configured to provide the key in lane 1 to the MIN cell, and the key in lane 0 to the MAX cell. The output of stage 1 is four sorted lists of keys, each of length 2. According to the example, lanes 2 and 3 have their keys swapped. The keys for the other pairs of lanes, i.e., lanes 0 and 1, lanes 4 and 5, and lanes 6 and 7 pass through stage 1 without swapping, as the respective keys for the lane pairs are already sorted. The count in lanes 5 and 7 are incremented (higher lanes of the respective compared lanes having the same key).

Figure 8C:
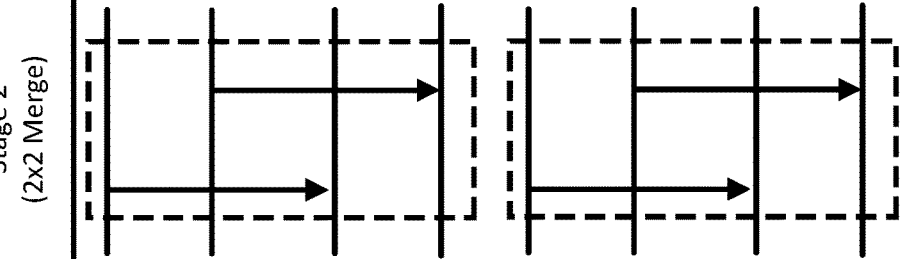
FIG. 8C depicts an example stage 2 of the odd/even merge network of an XPU according to aspects of the disclosure.

FIG. 8C shows an example stage 2 800C of the odd/even merge network of an XPU, according to aspects of the disclosure. In the second stage, the adjacent lists are merged and keys in odd-number positions of the sorted lists from stage 1 are compared. Keys in even-number positions of the sorted lists are similarly compared. In stage 2, for example, processing cells in lanes 0 and 1 are MIN cells, while processing cells in lanes 2 and 3 are MAX cells. The duplicate counts for lanes 6 and 7 are incremented, as the higher lanes of the compared pairs (4, 6), (5,7) all having the key 5.

Figure 8D:
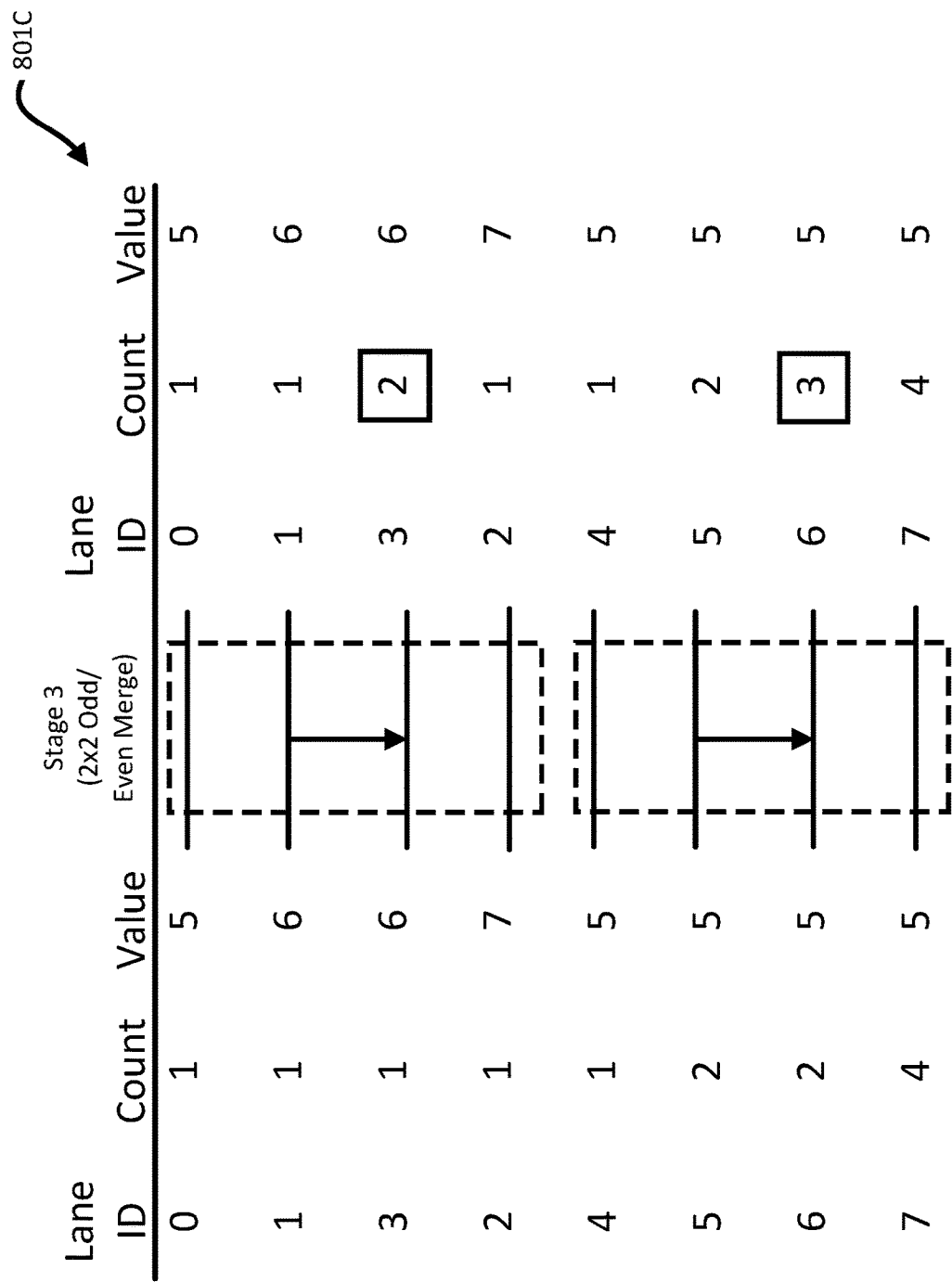
FIG. 8D depicts an example stage 3 of the odd/even merge network of an XPU according to aspects of the disclosure.

FIG. 8D shows an example stage 3 of the odd/even merge network of an XPU, according to aspects of the disclosure. In the third stage, the remaining keys in the middle lanes of each sorted list are compared, i.e., lanes (1,3) and (5,6). The duplicate count for lane 3 is incremented because 6=6 and the duplicate count for lane 6 is incremented because 5=5.

Figure 8E:
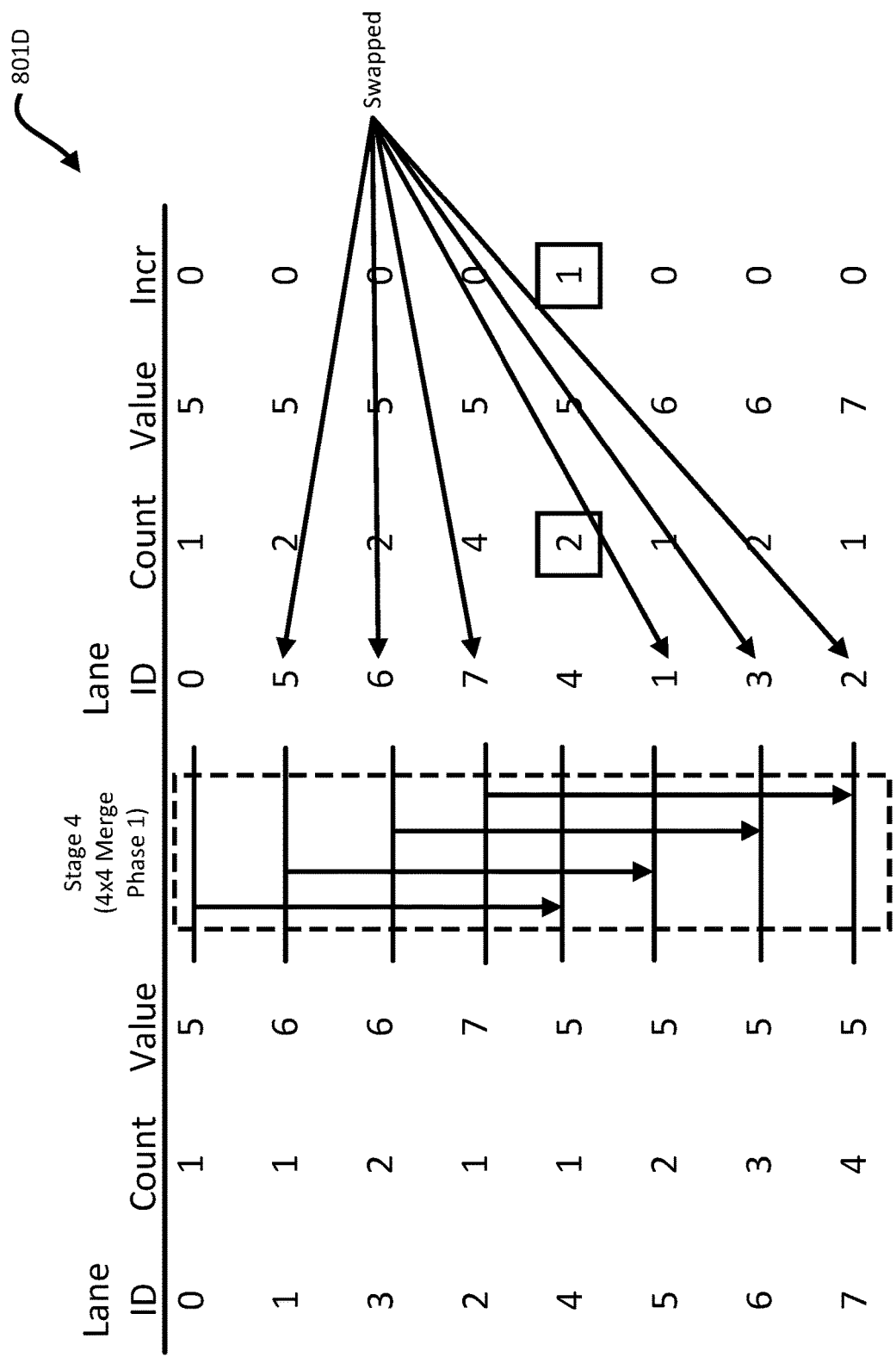
FIG. 8E depicts an example stage 4 of the odd/even merge network of an XPU according to aspects of the disclosure.

FIG. 8E shows an example stage 4 of the odd/even merge network of an XPU, according to aspects of the disclosure. The fourth stage is phase 1 of the 4×4 even-even/odd-odd merge. Lanes 0, 4; 1, 5; 2, 6; and 3, 7 are compared and swapped, as necessary. The duplicate count for lane 4 is incremented (lane 1 had a value of 5, lane 4 had a value of 5). The increment value for lane 4 is also set to 1 (the count of the larger lane 4). In this example, all the compared pairs are swapped.

Figure 8F:
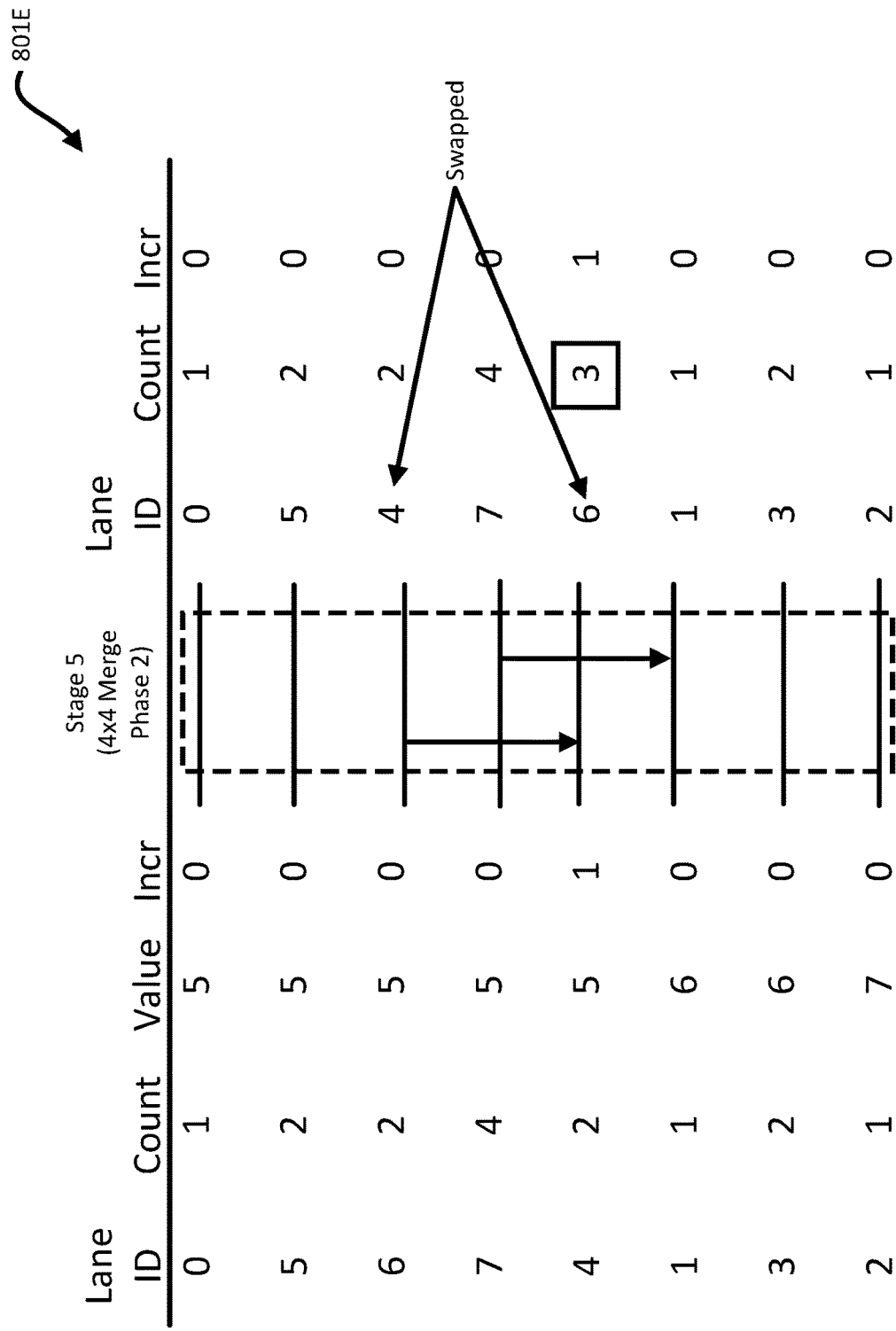
FIG. 8F depicts an example stage 5 of the odd/even merge network of an XPU according to aspects of the disclosure.

FIG. 8F shows an example stage 5 of the odd/even merge network of an XPU, according to aspects of the disclosure. The values from lanes 6 and 4 are compared (and swapped), as well as the values from lanes 7 and 1. The count in lane 6 is incremented by 1, because lanes 4 and 6 belong to the same half of the sorted list.

Figure 8G:
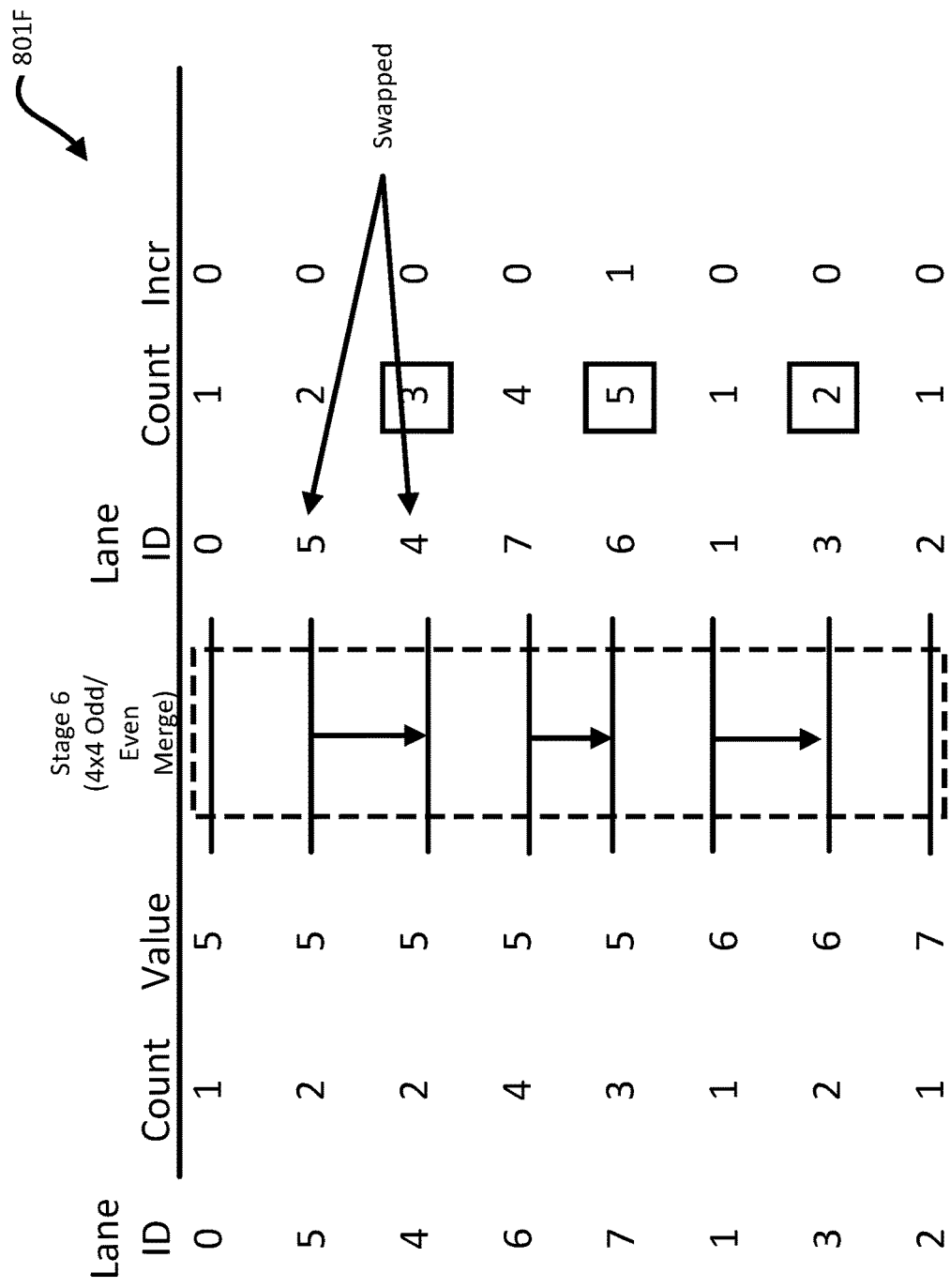
FIG. 8G depicts an example stage 6 of the odd/even merge network of an XPU according to aspects of the disclosure.

FIG. 8G shows an example stage 6 of the odd/even merge network of an XPU, according to aspects of the disclosure. The values from lanes 5 and 4 are compared and swapped. The values from lanes 6 and 7 are compared, and values from lanes 1 and 3 are compared. The counts for lanes 4, 7, and 3, are incremented.

Figure 8H:
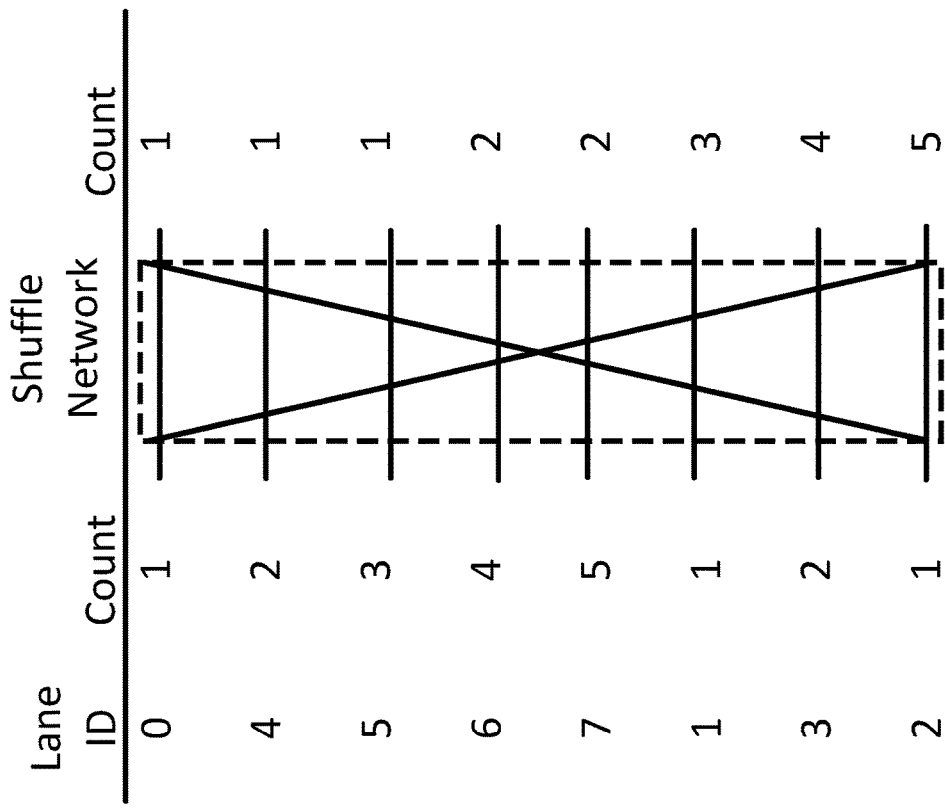
FIG. 8H depicts an example value shuffle network of the odd/even merge network of an XPU according to aspects of the disclosure.

FIG. 8H shows an example value shuffle network of the odd/even merge network of an XPU, according to aspects of the disclosure. After shuffling the counts are output in ascending order: {1, 1, 1,2,2,3,4,5}.

Other Example Composed Operations

In addition to vector sort and duplicate count, the XPU can be configured with a processing network of cells and crossbars to perform a variety of other operations, described presently. The operations include, for example, vector partition, vector histogram, vector permute, vector shift insert, vector gather, and vector scatter.

Vector Partition

The XPU can be configured to partition an input vector, element-by-element, according to a range of values defining multiple bins. The XPU partitions an input element into the smallest bin whose value is greater than or equal to the input element. The XPU can perform vector partition, for example as described herein, as part of a composed operation for converting an input sparse matrix from one format to another, such as from compressed row storage (CRS) to coordinate list (COO) format.

In each data processing lane, a respective processing cell receives an input value, such as an unsigned integer, to be partitioned. The input value can be an element of a vector or other data structure. The processing cell also receives a tuple of bin values and a mask value for the input value. Each of the input values and the elements of the bin tuple are of the same data type, such as a 32-bit unsigned integer. The bin tuple is indexed, with the first element of the tuple having an index of zero in implementations of the XPU using zero-indexing, or one otherwise. The second bin element has an index of one (or two), the third bin element has an index of two (or three), and so on.

For a bin tuple, bin[y] is the element of the tuple at index y. In some examples, the mask value is a mask for the input value. In other examples, the mask bit is instead a tuple of one or more mask bits, the index of each bit in the mask tuple corresponding to a respective bin element in the input bin tuple. For example, if the element mask[i] is equal to zero, then the bin element bin[i] at the same index i is masked and not processed as input by the XPU.

The output to a vector partition is a partition identifier, which is an index of the bin value in which the input value is partitioned to. The partition identifier is based on ranges defined by the tuple of bin values. Partition indices can take on a value from zero to one less than the number of data processing lanes for the XPU (or, can take on a value from one to the number of data processing lanes, in cases in which the partition identifier is one-indexed instead of zero-indexed).

For a given element values[i] at index i of the input vector, the partition identifier is the lowest value k such that the bin element bin[k] is less than or equal to the element of the input vector at values[i], which is less than the bin element bin[k+1]. In these examples, the last bin element of the bin tuple is set to the maximum value of the data type for the input values and bin elements. For example, the last bin element of the bin tuple is set to INT_MAX representing the highest value of a 32-bit unsigned integer, when the XPU performs a vector partition on a vector of 32-bit unsigned integer elements.

If the element at values[i] is not in range of a bin element, then the resulting partition identifier is masked when sent as output by the XPU. Also, if the bin tuple does not include monotonically increasing integer elements, then the partition identifier for the input element is undefined. In other words, the bin tuple must include a sequence of strictly increasing elements.

An example set of inputs to the XPU can be as follows:
Values={5, 7, 10, 1, 512, 8, 1023, 0}
Mask={0, 1, 0, 0, 1, 1, 1, 1}
Bin={0, 7, 256, 1024, 1, 0, 0, 1}

In this example, the mask values correspond to the input values, and not the bin values. Each lane of an eight-lane XPU can receive, for example, a respective input element from the input vector, and its corresponding mask bit. The output partition identifiers are:
Partition Identifiers: {0, 1, 1, 0, 2, 1, 2, 0}

Based on the mask values, only input values 7, 512, 8, and 1023 are partitioned. Further, there are four bins specified in the bin tuple, as only 0, 7, 256, and 1024 is the sequence of strictly increasing integer values. Values which have been masked have a partition identifier of zero. Of the remaining input values, 7 maps to partition identifier 1 (because 0, the first bin, is less than or equal to 7, but 7 is not less than 7). In these examples, bin[−1] is defined as the minimum negative value of the data type for the input values and bin elements. For example, the first bin element of the bin tuple is set to −INT_MAX representing the lowest value of a 32-bit unsigned integer multiplied by negative 1, when the XPU performs a vector partition on a vector of 32-bit unsigned integer elements.

In some examples, the rule applied by the XPU in determining the partition identifier for a value at value [i] is the lowest value k such that the bin element bin[k−1] is less than values[i] and values [i] is less than or equal to bin[k].

Vector Histogram

The XPU can be configured to count the number of occurrences of an input value within a vector. The output by the XPU is a list of unique elements, along with the count of their occurrence. The input to the XPU also includes a mask bit for each input value, only counting the number of occurrences of unmasked values.

Example Input to the XPU can be as Follows:
Values={0, 0, 1, 0, 2, 1, 2, 100}
Mask={0, 0, 0, 0, 0, 0, 0, 1}

In this example, the value 100 is masked, and is not considered by the XPU in the vector histogram operation.

Example Output by the XPU can be as Follows:
Values={0, 1, 2, 0, 0, 0, 0, 0}
Count={3, 2, 2, 0, 0, 0, 0, 0}
Mask={0, 0, 0, 1, 1, 1, 1, 1}

The values are output by unique values first, i.e., 0, 1, and 2. Each element in the list of count values corresponds to the count of each unique value, i.e., 3 zeroes, 2 ones, and 2 twos in the input. Lastly, the XPU also outputs a mask for the remaining output vector elements previously masked in the input or not including a unique value. The input vector is sorted beforehand, so that each element of the list of count values can match a corresponding unique value from smallest to largest (or vice versa, depending on the sort).

Vector Compact

The XPU can be configured to remove masked elements of an input vector starting at an input offset and return an output vector of the removed elements. At each data processing lane, a respective processing cell receives an input value and a mask bit for the value, as well as an offset. If the input value is not masked, then it is bypassed by the processing cell.

An Example Set of Inputs to the XPU can be as Follows:
Values={0, 1, 2, 3, 4, 5, 6, 7}
Mask={1, 0, 1, 0, 1, 0, 0, 1}
Offset=5

From the values received, the values 0, 2, 4, and 7 are masked for removal. The offset is 5, so example output by the XPU can be as follows:
Values={7, 1, 3, 5, 6, 0, 2, 4}
Mask={0, 1, 1, 1, 1, 0, 0, 0,}

The offset is 5, but the fifth element in the input values is not masked, so the XPU continues through the input values to the first masked value, 7. The XPU then includes the previously unmasked values of the input vector, in the output vector. These values are now masked. The remaining values of the output vector are the masked values of the input vector, in order of appearance in the input vector.

Vector Reduce

The XPU can be configured to reduce an input vector, such as by summing up each element of an input vector and returning the sum or returning the maximum or minimum-valued element in the input vector. For example, the XPU can reduce an input vector by summing each element of the vector. For vectors larger than the total number of data processing lanes, the XPU can maintain a running sum for summing the elements of each segment of the input vector of a size up to the total number of lanes.

Vector Permute

The XPU can be configured to permute an input vector according to a provided pattern. The input vector can be reshaped, for example to be provided as input to a neural network layer requiring input of a certain shape. The XPU can permute vectors as large as the number of data processing lanes for the XPU. Vectors larger than the total number of data processing lanes can be permuted in smaller segments, up to the total number of lanes.

Vector Shift Insert

The XPU can be configured to receive two vectors as operands, called $v_0$ and $v_1$, and a scalar offset value. The scalar offset defines the starting point in a third vector $v_3$, if vectors $v_0$ and $v_1$ were concatenated. The output is a selection of a vector as long as the number of data processing elements in the XPU, beginning at the first value at offset in vector $v_3$. The offset can be an integer value between zero and one less than the number of data processing elements.

An Example Set of Inputs to the XPU can be as Follows:
Vector $v_0$={1, 2, 3, 4, 5, 6, 7, 8}
Vector $v_i$={a, b, c, d, e, f, g, h}
Scalar offset value=6

In this example, vector $v_i$ includes letters for purposes of illustrating how the XPU can generate an output vector to a vector shift insert from both input vectors. The selected vector from performing the vector shift insert is:
Selected vector={7, 8, a, b, c, d, e, f}

The first two elements of the selected vector are 7 and 8, because the first element in vector $v_0$ at offset six is 7. Then, the next 7 elements are selected, ending at vector $v_0$ and continuing through vector $v_1$.

Figure 9:
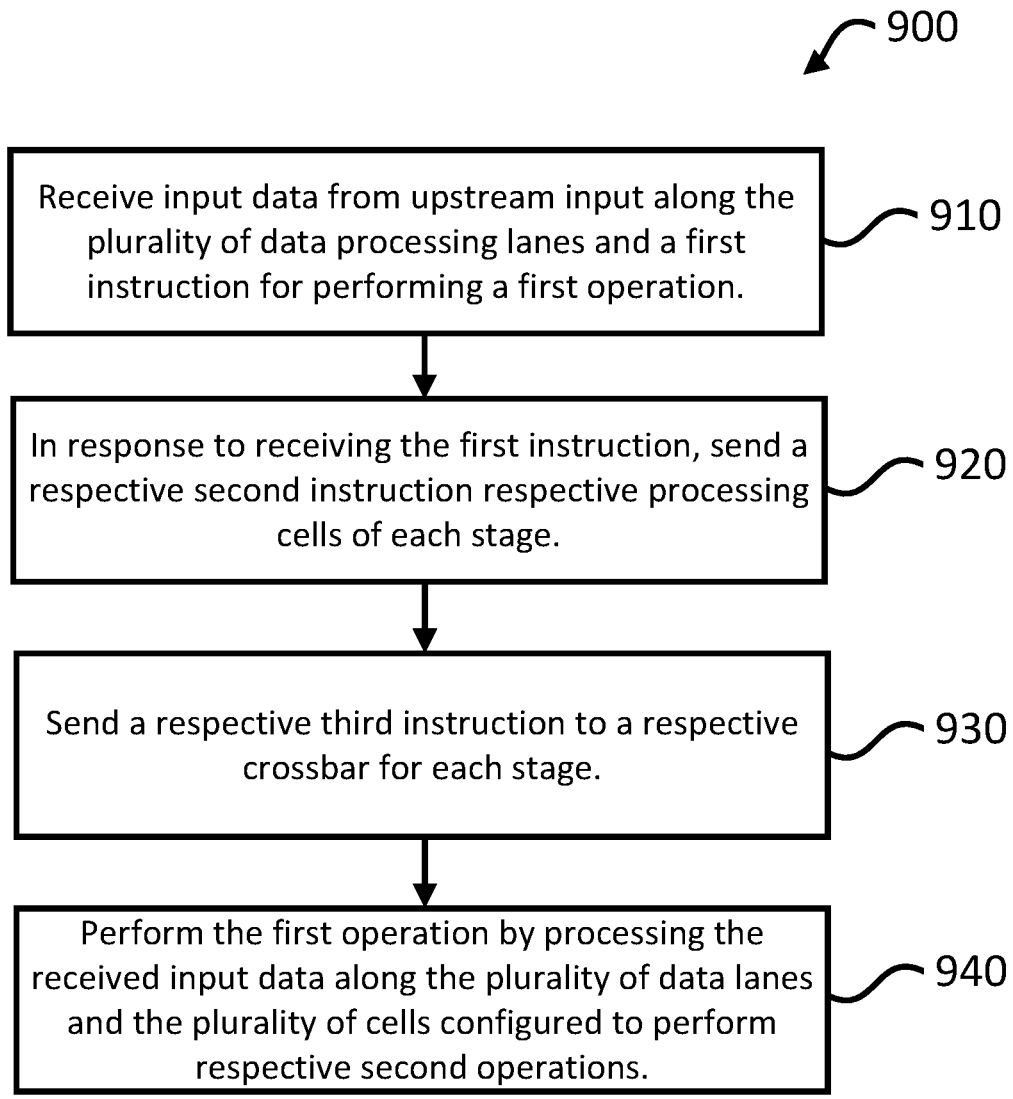
FIG. 9 depicts a flowchart of an example process for performing a composed operation on an XPU according to aspects of the disclosure.

FIG. 9 is a flowchart of an example process 900 for performing a composed operation on an XPU. A hardware circuit can be configured with an XPU that includes multiple stages. Each stage can include a crossbar and two or more processing cells. Multiple data processing lanes stream respective data from an upstream input to a downstream destination. Through the cells and crossbars of the stages.

The hardware receives input data from the upstream input along the data processing lanes, and a first instruction for performing a first operation, according to block 910. The upstream input can be a processor or memory device from which data for processing on the XPU of the hardware circuit is sent. The first operation is a composed operation, such as vector scan, vector segmented scan, vector sort, vector duplicate count, etc. The first instruction can be a control signal representing the composed operation.

In response to receiving the first instruction, for each stage, the hardware circuit sends a respective second instruction to respective processing cells of the stage, each cell configured to perform a respective second operation in response to receiving an input from a respective data processing lane, according to block 920. The second operations are primitive operations performed by the processing cells. The instructions can be received from a respective control cell corresponding to each processing cell, as described herein with reference to FIGS. 3-4.

In response to receiving the first instruction, for each stage, the hardware circuit sends a respective third instruction to a respective crossbar for each stage, according to block 930.

The hardware circuit performs the first operation by processing the received input data along the plurality of data processing lanes and the plurality of cells configured to perform respective second operations, according to block 940. The cells and crossbars form a processing network for performing the first operation, such as in the configurations 500-600 shown and described with reference to FIGS. 5-6.

Figure 10:
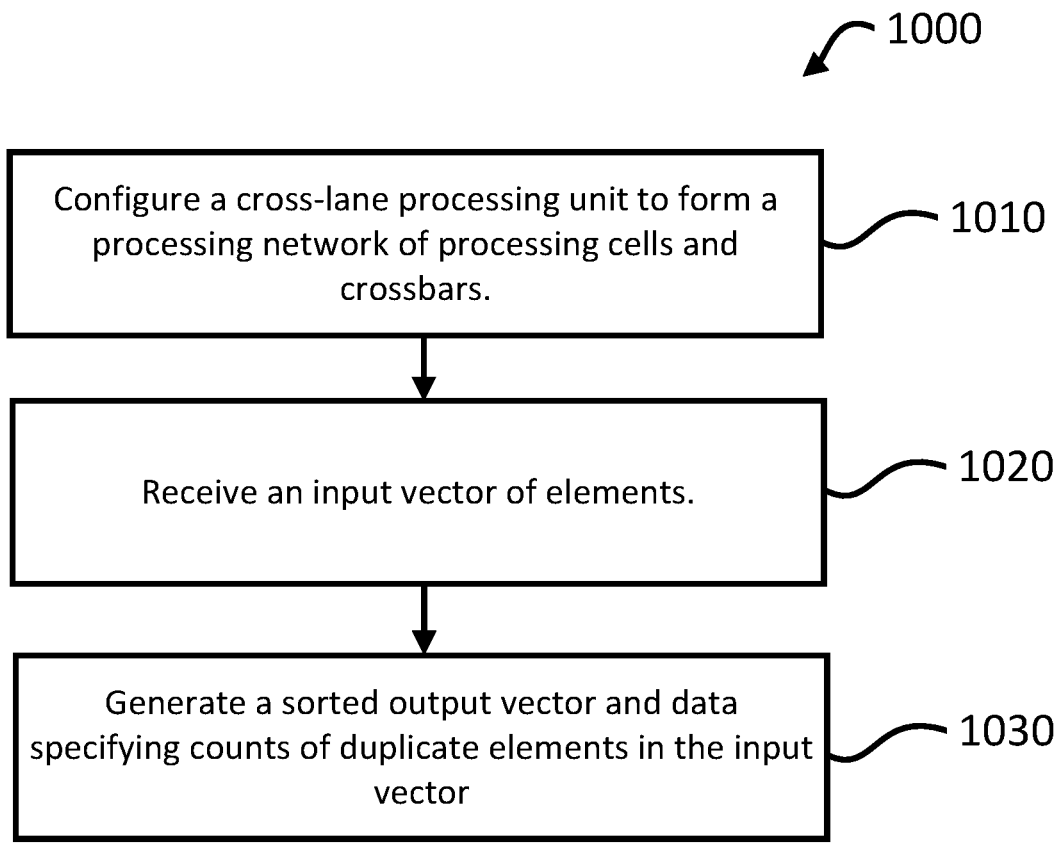
FIG. 10 depicts a flowchart of an example process for sorting and generating a duplicate count for an input vector to an XPU according to aspects of the disclosure.

FIG. 10 is a flowchart of an example process 1000 for sorting and generating a duplicate count for an input vector to an XPU, according to aspects of the disclosure.

The hardware circuit configures a cross-lane processing unit to form a processing network of processing cells and crossbars, according to block 1010. For example, the hardware circuit can receive instructions as described herein with reference to FIG. 9, to generate a vector sort and duplicate count processing network, as described herein with reference to FIGS. 8A-H.

The hardware circuit receives an input vector of elements, according to block 1020. The hardware circuit generates a sorted output vector and data specifying counts of duplicate elements in the input vector, according to block 1030. An example generation of the sorted output vector and data specifying duplicate counts is described herein with reference to FIGS. 8A-H.

Example Computing Environment

Figure 11:
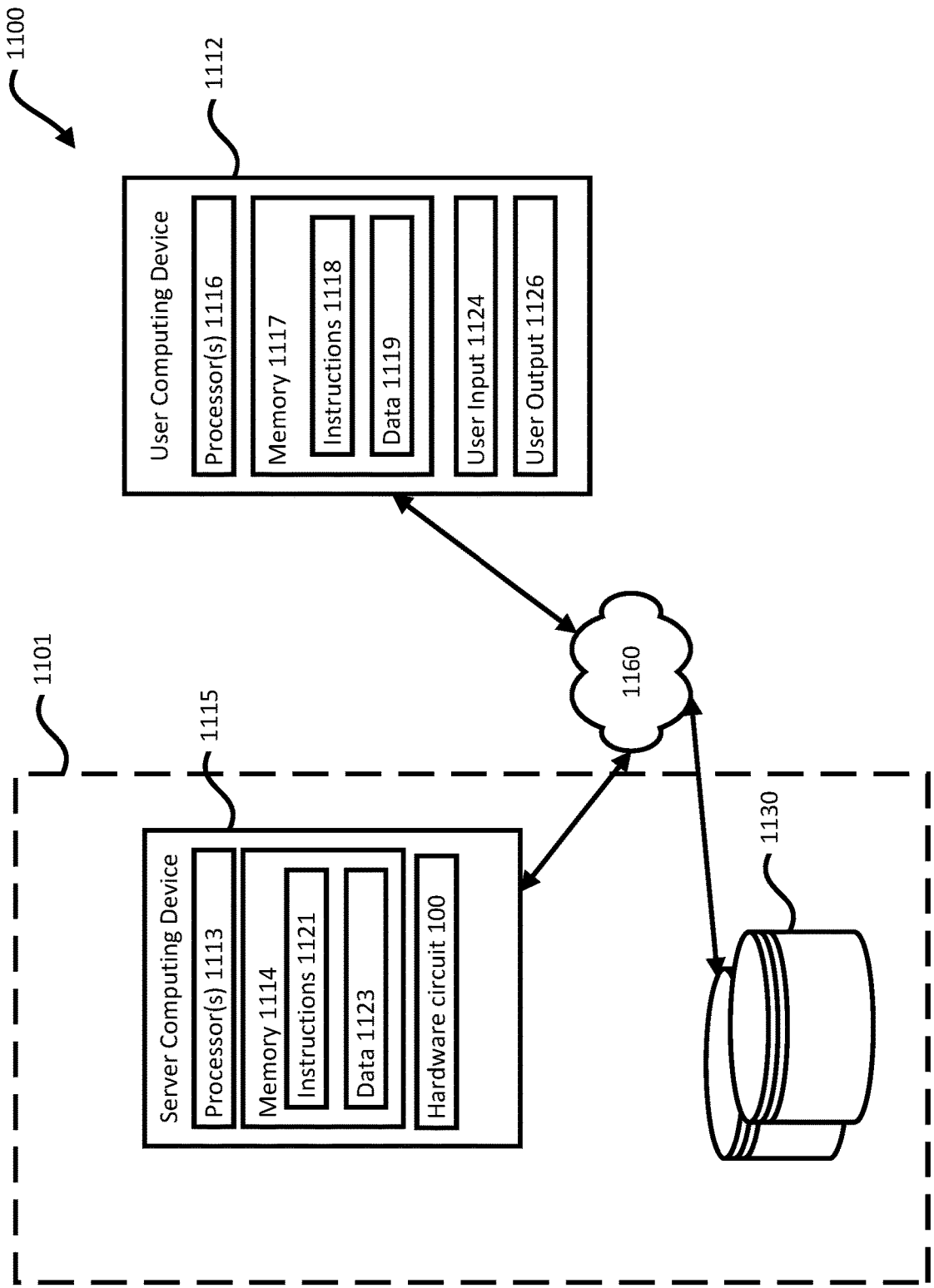
FIG. 11 depicts a block diagram of an example environment for implementing the hardware circuit according to aspects of the disclosure.

FIG. 11 is a block diagram of an example environment 1100 for implementing the hardware circuit 101. The hardware circuit 101 can be implemented on a device having one or more processors in one or more locations, such as in server computing device 1115. User computing device 1112 and the server computing device 1115 can be communicatively coupled to one or more storage devices 1130 over a network 1160. The storage device(s) 1130 can be a combination of volatile and non-volatile memory and can be at the same or different physical locations than the computing devices 1112, 1115. For example, the storage device(s) 1130 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 1115 can include one or more processors 1113 and memory 1114. The memory 1114 can store information accessible by the processor(s) 1113, including instructions 1121 that can be executed by the processor(s) 1113. The memory 1114 can also include data 1123 that can be retrieved, manipulated, or stored by the processor(s) 1113. The memory 1114 can be a type of non-transitory computer readable medium capable of storing information accessible by the processor(s) 1113, such as volatile and non-volatile memory. The processor(s) 1113 can include one or more central processing units (CPUs), graphic processing units (GPUs), field-programmable gate arrays (FPGAs), and/or application-specific integrated circuits (ASICs), such as tensor processing units (TPUs). The processor(s) 1113 can include a co-processor implemented as part of the hardware circuit, as described herein with reference to FIG. 1.

The instructions 1121 can include one or more instructions that when executed by the processor(s) 1113, causes the one or more processors to perform actions defined by the instructions. The instructions 1121 can be stored in object code format for direct processing by the processor(s) 1113, or in other formats including interpretable scripts or collections of independent source code modules that are interpreted on demand or compiled in advance. The instructions 1121 can include instructions for configuring the XPU of the hardware circuit 101 consistent with aspects of this disclosure. The server computing device 1115 and/or the user computing device 1112 can implement a compiler or other program for generating and sending instructions to the hardware circuit 101 as control signals for configuring the XPU of the circuit.

The data 1123 can be retrieved, stored, or modified by the processor(s) 1113 in accordance with the instructions 1121. The data 1123 can be stored in computer registers, in a relational or non-relational database as a table having a plurality of different fields and records, or as JSON, YAML, proto, or XML documents. The data 1123 can also be formatted in a computer-readable format such as, but not limited to, binary values, ASCII, or Unicode.

Moreover, the data 1123 can include information sufficient to identify relevant information, such as numbers, descriptive text, proprietary codes, pointers, references to data stored in other memories, including other network locations, or information that is used by a function to calculate relevant data.

The user computing device 1112 can also be configured similar to the server computing device 115, with one or more processors 1116, memory 1117, instructions 1118, and data 1119. The user computing device 1112 can also include a user output 1126, and a user input 1124. The user input 1124 can include any appropriate mechanism or technique for receiving input from a user, such as keyboard, mouse, mechanical actuators, soft actuators, touchscreens, microphones, and sensors.

The server computing device 1115 can be configured to transmit data to the user computing device 1112, and the user computing device 1112 can be configured to display at least a portion of the received data on a display implemented as part of the user output 1126. The user output 1126 can also be used for displaying an interface between the user computing device 1112 and the server computing device 1115. The user output 1126 can alternatively or additionally include one or more speakers, transducers or other audio outputs, a haptic interface or other tactile feedback that provides non-visual and non-audible information to the platform user of the user computing device 1112.

Although FIG. 11 illustrates the processors 1113, 1116 and the memories 1114, 1117 as being within the computing devices 1115, 1112, components described in this specification, including the processors 1113, 1116 and the memories 1114, 1117 can include multiple processors and memories that can operate in different physical locations and not within the same computing device. For example, some of the instructions 1121, 1118 and the data 1123, 1119 can be stored on a removable SD card and others within a read-only computer chip. Some or all of the instructions and data can be stored in a location physically remote from, yet still accessible by, the processors 1113, 1116. Similarly, the processors 1113, 1116 can include a collection of processors that can perform concurrent and/or sequential operation. The computing devices 1115, 1112 can each include one or more internal clocks providing timing information, which can be used for time measurement for operations and programs run by the computing devices 1115, 1112.

The server computing device 1115 can be configured to receive requests to process data from the user computing device 1112. For example, the environment 1100 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 1112 may receive and transmit data specifying a workload or type of composed operation the XPU of the hardware circuit 101 should be configured to perform. The user computing device 1112 can send the instructions directly to the hardware circuit 101 or cause the server computing device 1115 to generate and send instructions as control signals to the hardware circuit 101 as described herein.

The devices 1112, 1115 can be capable of direct and indirect communication over the network 1160. The devices 1115, 1112 can set up listening sockets that may accept an initiating connection for sending and receiving information. The network 1160 itself can include various configurations and protocols including the Internet, World Wide Web, intranets, virtual private networks, wide area networks, local networks, and private networks using communication protocols proprietary to one or more companies. The network 1160 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 1160, in addition or alternatively, can also support wired connections between the devices 1112, 1115, including over various types of Ethernet connection.

Although a single server computing device 1115 and user computing device 1112 are shown in FIG. 11, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware and hardware circuits, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A hardware circuit, comprising:
   a plurality of stages, each stage comprising a crossbar and a plurality of cells; and
   a plurality of data processing lanes streaming data from an upstream input to a downstream destination through the crossbar and a plurality of cells of respective stages;
   wherein the hardware circuit is configured to:
      receive input data and instructions for performing a first operation from the upstream input;
      for each stage, send respective instructions to the crossbar and plurality of cells, the crossbar configured to permute outputs along the plurality of data processing lanes, the plurality of cells configured to perform respective processing operations based on the instructions; and perform the first operation by processing the received input data along the plurality of data processing lanes.

2. The hardware circuit of claim 1, wherein a cell of the plurality of cells of a stage of the plurality of stages is configured to receive a first input operand from a data processing lane passing through the cell and a second input operand from a crossbar upstream to the cell.

3. The hardware circuit of claim 1, wherein the downstream destination is a vector processing unit configured to perform single instruction, multiple data vector operations on output data of the hardware circuit.

4. The hardware circuit of claim 1, further comprising a plurality of control cells configured to generate and send respective control signals to respective cells based on the first operation.

5. The hardware circuit of claim 4, wherein the respective control signals cause respective cells to perform one of a respective arithmetic, comparison, or bypass operation.

6. The hardware circuit of claim 4, wherein the crossbar and plurality of cells form a processing network of connected cells configured to receive the input data and to generate respective output data in accordance with performing the first operation on the input data.

7. The hardware circuit of claim 6, wherein the processing network of connected cells is configured to perform a combined vector sort and duplicate count operation.

8. The hardware circuit of claim 1, wherein the hardware circuit is configured to perform one of a vector scan, a vector summation, a vector sort, or a vector duplicate count on sparse vector data of the input data.

9. A system comprising:
a hardware circuit comprising a plurality of stages, each stage comprising a crossbar and a plurality of cells, and a plurality of data processing lanes streaming data from an upstream input to a downstream destination through the crossbar and a plurality of cells of respective stages;
wherein the hardware circuit is configured to:
receive input data and instructions for performing a first operation from the upstream input;
for each stage, send respective instructions to the crossbar and plurality of cells, the crossbar configured to permute outputs along the plurality of data processing lanes, the plurality of cells configured to perform respective processing operations based on the instructions; and
perform the first operation by processing the received input data along the plurality of data processing lanes.

10. The system of claim 9, wherein a cell of the plurality of cells of a stage of the plurality of stages is configured to receive a first input operand from a data processing lane passing through the cell and a second input operand from a crossbar upstream to the cell.

11. The system of claim 9, wherein the downstream destination is a vector processing unit configured to perform single instruction, multiple data vector operations on output data of the hardware circuit.

12. The system of claim 9, wherein the hardware circuit further comprises a plurality of control cells configured to generate and send respective control signals to respective cells based on the first operation.

13. The system of claim 12, wherein the respective control signals cause respective cells to perform one of a respective arithmetic, comparison, or bypass operation.

14. The system of claim 12, wherein the crossbar and plurality of cells form a processing network of connected cells configured to receive the input data and to generate respective output data in accordance with performing the first operation on the input data.

15. The system of claim 14, wherein the processing network of connected cells is configured to perform a combined vector sort and duplicate count operation.

16. The system of claim 9, wherein the hardware circuit is configured to perform one of a vector scan, a vector summation, a vector sort, or a vector duplicate count on sparse vector data of the input data.

17. A computer-implemented method, comprising:
receiving, by a hardware circuit, input data and instructions for performing a first operation from an upstream input along a plurality of data processing lanes, the hardware circuit comprising a plurality of stages, each stage comprising a crossbar and a plurality of cells, and the plurality of data processing lanes streaming data from the upstream input to a downstream destination through the crossbar and a plurality of cells of respective stages;
for each stage, sending, by the hardware circuit, respective instructions to the crossbar and plurality of cells, the crossbar configured to permute outputs along the plurality of data processing lanes, the plurality of cells configured to perform respective processing operations based on the instructions; and
performing, by the hardware circuit, the first operation by processing the received input data along the plurality of data processing lanes.

18. The method of claim 17, wherein a cell of the plurality of cells of a stage of the plurality of stages is configured to receive a first input operand from a data processing lane passing through the cell and a second input operand from a crossbar upstream to the cell.

19. The method of claim 17, wherein the downstream destination is a vector processing unit configured to perform single instruction, multiple data vector operations on output data of the hardware circuit.

20. The method of claim 17, wherein the hardware circuit further comprises a plurality of control cells configured to generate and send respective control signals to respective cells based on the first operation.

* * * * *